US011851090B2

(12) United States Patent
Yashiro

(10) Patent No.: US 11,851,090 B2
(45) Date of Patent: Dec. 26, 2023

(54) VEHICLE CONTROL APPARATUS, VEHICLE CONTROL METHOD, AND STORAGE MEDIUM

(71) Applicant: HONDA MOTOR CO., LTD., Tokyo (JP)

(72) Inventor: Katsuya Yashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 345 days.

(21) Appl. No.: 16/819,212

(22) Filed: Mar. 16, 2020

(65) Prior Publication Data

US 2020/0307634 A1 Oct. 1, 2020

(30) Foreign Application Priority Data

Mar. 25, 2019 (JP) ................. 2019-056543

(51) Int. Cl.
*B60W 60/00* (2020.01)
*G08G 1/0965* (2006.01)
*G08G 1/087* (2006.01)

(52) U.S. Cl.
CPC .... *B60W 60/0018* (2020.02); *B60W 60/0051* (2020.02); *G08G 1/087* (2013.01);
(Continued)

(58) Field of Classification Search
CPC ......... B60W 60/0018; B60W 60/0051; B60W 2420/42; B60W 2520/10;
(Continued)

(56) References Cited

U.S. PATENT DOCUMENTS 10,077,052 B2 * 9/2018 Halder ................ B60W 30/182
2016/0252905 A1 9/2016 Tian et al.
(Continued)

FOREIGN PATENT DOCUMENTS

JP 2006-315491 11/2006
JP 2007-168504 7/2007
(Continued)

OTHER PUBLICATIONS

Japanese Notice of Allowance for Japanese Patent Application No. 2019-056543 dated Aug. 3, 2021.
(Continued)

*Primary Examiner* — Geepy Pe
*Assistant Examiner* — Paulo Roberto Gonzalez Leite
(74) *Attorney, Agent, or Firm* — AMIN, TUROCY & WATSON, LLP

(57) ABSTRACT

A vehicle control apparatus includes a recognizer which recognize a surrounding situation of a host vehicle, and a driving controller which controls acceleration/deceleration of the host vehicle on the basis of a recognition result of the recognizer, wherein the driving controller causes the host vehicle to operate in any of a first driving state and a second driving state which has a higher rate of automation or fewer tasks requested with respect to an occupant than the first driving state, and changes a driving state of the host vehicle to the second driving state on the basis of at least one of presence or absence of a recognized following vehicle positioned behind the host vehicle and a following vehicle detection situation when the host vehicle is operating in the first driving state.

10 Claims, 15 Drawing Sheets

(52) U.S. Cl.
CPC ....... *G08G 1/0965* (2013.01); *B60W 2420/42* (2013.01); *B60W 2520/10* (2013.01)

(58) Field of Classification Search
CPC ....... B60W 2300/105; B60W 60/0027; B60W 50/082; G08G 1/087; G08G 1/0965
See application file for complete search history.

(56) References Cited

U.S. PATENT DOCUMENTS

| | | | |
|---|---|---|---|
| 2018/0239352 A1* | 8/2018 | Wang | B60W 60/0053 |
| 2018/0281819 A1 | 10/2018 | Akaba et al. | |
| 2018/0364732 A1* | 12/2018 | Yaldo | G08G 1/0965 |
| 2019/0039613 A1* | 2/2019 | Lee | G08G 1/167 |
| 2019/0308617 A1* | 10/2019 | Groult | B60W 30/18163 |

FOREIGN PATENT DOCUMENTS

| | | |
|---|---|---|
| JP | 2008-084004 | 4/2008 |
| JP | 2017-226343 | 12/2017 |
| JP | 2018-067225 | 4/2018 |
| WO | 2018/163549 | 9/2018 |

OTHER PUBLICATIONS

Japanese Office Action for Japanese Patent Application No. 2019-056543 dated Jun. 8, 2021.
Chinese Office Action for Chinese Patent Application No. 202010189090.9 dated Dec. 2, 2022.

* cited by examiner

FIG. 4

| VEHICLE SPEED [km/h] | FIRST PREDETERMINED DISTANCE Th1 |
|---|---|
| EQUAL TO OR GREATER THAN 100 | 100 [m] |
| LESS THAN 100 AND EQUAL TO OR GREATER THAN 70 | 80 [m] |
| LESS THAN 70 AND EQUAL TO OR GREATER THAN 30 | 60 [m] |
| LESS THAN 30 | 30 [m] |

VEHICLE CONTROL APPARATUS, VEHICLE CONTROL METHOD, AND STORAGE MEDIUM

CROSS-REFERENCE TO RELATED APPLICATION

Priority is claimed on Japanese Patent Application No. 2019-056543, filed Mar. 25, 2019, the content of which is incorporated herein by reference.

BACKGROUND

Field of the Invention

The present invention relates to a vehicle control apparatus, a vehicle control method, and a storage medium.

Description of Related Art

A conventional technology for reducing the speed of a host vehicle and pulling the host vehicle over to the shoulder of a road when an emergency vehicle is identified by analyzing an image captured by a camera included in the host vehicle is known (e.g., US Patent Application No. 2016/0252905 specification).

SUMMARY

However, in the conventional technology, it may be difficult to recognize an emergency vehicle until the emergency vehicle has approached immediately behind the host vehicle. In this case, a time may be required to switch an automated driving state of the host vehicle according to approach of the emergency vehicle and it may be impossible to rapidly prepare for approach of the emergency vehicle.

An object of aspects of the present invention devised in view of such circumstances is to provide a vehicle control apparatus, a vehicle control method, and a storage medium which can prepare for approach of an emergency vehicle more rapidly.

A vehicle control apparatus, a vehicle control method, and a storage medium according to the present invention employ the following configurations.

(1): A vehicle control apparatus according to one aspect of the present invention includes: a recognizer which recognize a surrounding situation of a host vehicle; and a driving controller which controls acceleration/deceleration of the host vehicle on the basis of a recognition result of the recognizer, wherein the driving controller causes the host vehicle to operate in any of a first driving state and a second driving state which has a higher rate of automation or fewer tasks requested with respect to an occupant than the first driving state and changes a driving state of the host vehicle to the second driving state on the basis of at least one of presence or absence of a recognized following vehicle positioned behind the host vehicle and a following vehicle detection situation when the host vehicle is operating in the first driving state.

(2): In the aspect of (1), when the host vehicle is operating in the first driving state, the driving controller changes the first driving state to the second driving state when a vehicle-to-vehicle distance between the following vehicle recognized by the recognizer and the host vehicle is equal to or less than a first predetermined distance.

(3): In the aspect of (1), the driving controller changes the driving state from the first driving state to the second driving state when a speed of the host vehicle is less than a predetermined speed, and the recognizer executes a process of recognizing the following vehicle when the host vehicle is operating in the first driving state.

(4): In the aspect of (1), when the following vehicle is not recognized by the recognizer in the second driving state, the driving controller changes the driving state to the first driving state.

(5): In the aspect of (1), the driving controller changes the driving state to the first driving state when the vehicle-to-vehicle distance between the following vehicle recognized by the recognizer and the host vehicle is equal to or greater than a second predetermined distance or a distance between a travel path through which the following vehicle recognized by the recognizer travels and a travel path through which the host vehicle travels in a vehicle width direction is equal to or greater than a third predetermined distance.

(6): In the aspect of (5), the second predetermined distance is a value depending on a travel speed of the host vehicle.

(7): In the aspect of (1), the driving controller changes the driving state to the second driving state when the following vehicle recognized by the recognizer is of a predetermined type in the first driving state and prevents change to the second driving state when the following vehicle recognized by the recognizer is not of the predetermined type.

(8): In the aspect of (1), the driving controller prevents change to the second driving state when a distance between the host vehicle and the following vehicle in the vehicle width direction is equal to or greater than a fourth predetermined distance in the first driving state.

(9): In the aspect of (1), the driving controller continues the second driving state when a plurality of following vehicles are recognized by the recognizer and a first following vehicle closest to the host vehicle from among the plurality of following vehicles and a second following vehicle positioned behind the first following vehicle are recognized in the second driving state, and changes the driving state to the first driving state when the first following vehicle is recognized by the recognizer and the second following vehicle is not recognized.

(10): A vehicle control method according to one aspect of the present invention, using a computer, includes: recognizing a surrounding situation of a host vehicle; controlling acceleration/deceleration of the host vehicle on the basis of a recognition result of the recognizer; causing the host vehicle to operate in any of a first driving state and a second driving state which has a higher rate of automation or fewer tasks requested with respect to an occupant than the first driving state; and changing a driving state of the host vehicle to the second driving state on the basis of at least one of presence or absence of a recognized following vehicle positioned behind the host vehicle and a following vehicle detection situation when the host vehicle is operating in the first driving state.

(11): A storage medium according to one aspect of the present invention is a computer-readable non-transitory storage medium causing a computer to: recognize a surrounding situation of a host vehicle; control acceleration/deceleration of the host vehicle on the basis of a recognition result the recognizer; cause the host vehicle to operate in any of a first driving state and a second driving state which has a higher rate of automation or fewer tasks requested with respect to an occupant than the first driving state; and change a driving state of the host vehicle to the second driving state on the basis of at least one of presence or absence of a recognized following vehicle positioned behind the host vehicle and a following vehicle detection situation when the host vehicle is operating in the first driving state.

According to the aspects of (1) to (11), it is possible to prepare for approach of an emergency vehicle more rapidly.

According to the aspect of (6), it is possible to prepare for approach of an emergency vehicle more appropriately according to a speed of a host vehicle.

According to the aspect of (7), it is possible to prevent automated driving levels from randomly changing.

According to the aspect of (8), it is possible to prevent changing from the first driving state to the second driving state in an inappropriate state.

BRIEF DESCRIPTION OF THE DRAWINGS

FIG. 4 is a diagram showing an example of correspondence between the speed of a host vehicle M and a first predetermined distance.

DESCRIPTION OF EMBODIMENTS

Hereinafter, embodiments of a vehicle control apparatus, a vehicle control method, and a storage medium of the present invention will be described with reference to the drawings. Although description will be given on the premise of countries or regions in which the law of the left-hand traffic is applied hereinafter, left and right may be reversely read when the law of the right-handed traffic is applied.

First Embodiment

[Overall Configuration]

Figure 1:
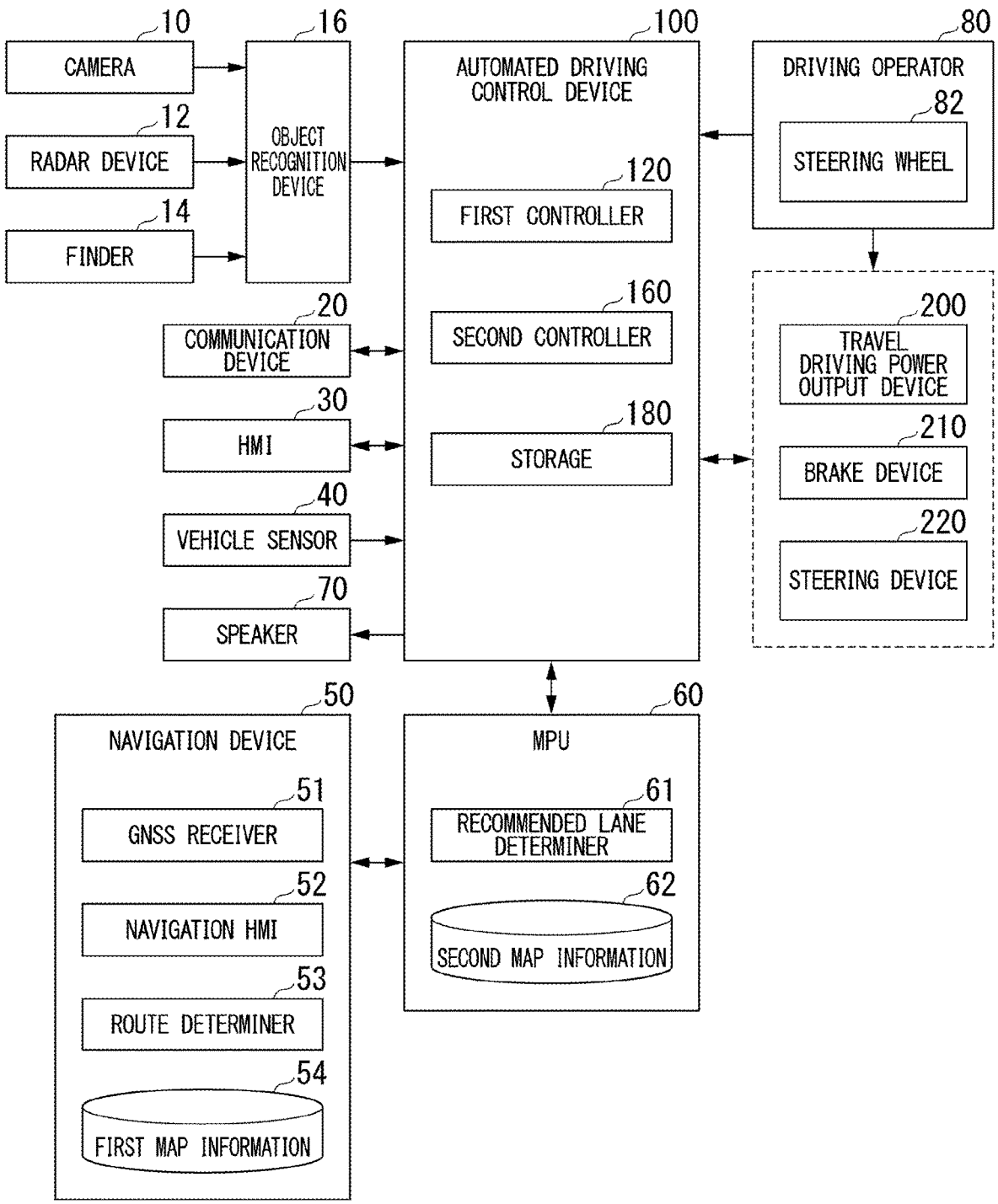
FIG. 1 is a block diagram of a vehicle system using a vehicle control apparatus according to a first embodiment.

FIG. 1 is a block diagram of a vehicle system 1 using a vehicle control apparatus according to a first embodiment. A vehicle equipped with the vehicle system 1 may be, for example, a two-wheeled, three-wheeled, four-wheeled vehicle or the like and a driving source thereof includes an internal combustion engine such as a diesel engine or a gasoline engine, a motor or a combination thereof. The motor operates using power generated by a generator connected to the internal combustion engine or power discharged from a secondary battery or a fuel battery.

For example, the vehicle system 1 may include a camera 10, a radar device 12, a finder 14, an object recognition device 16, a communication device 20, a human machine interface (HMI) 30, a vehicle sensor 40, a navigation device 50, a map positioning unit (MPU) 60, a speaker 70, a driving operator 80, an automated driving control device 100, a travel driving power output device 200, a brake device 210, and a steering device 220. These devices and apparatuses are connected through a multiplex communication line such as a controller area network (CAN), a serial communication line, a wireless communication network, and the like. The configuration shown in FIG. 1 is merely an example and part of the configuration may be omitted or other configurations may be further added.

For example, the camera 10 may be a digital camera using a solid state imaging device such as a charge coupled device (CCD) or a complementary metal oxide semiconductor (CMOS). The camera 10 is attached to any portion of a vehicle equipped with the vehicle system 1 (hereinafter, a host vehicle M). When a front view image is captured, the camera 10 is attached to the upper part of the front windshield, the rear side of a rear view mirror, or the like. When a rear view image is captured, the camera 10 is attached to the upper part of the rear windshield, or the like. For example, the camera 10 may periodically repeatedly capture images of the surroundings of the host vehicle M. The camera 10 may be a stereo camera.

The radar device 12 radiates electric waves such as millimeter waves to the surroundings of the host vehicle M and detects electric waves (reflected waves) reflected by an object to detect at least the position (distance and direction) of the object. The radar device 12 is attached to any portion of the host vehicle M. The radar device 12 may detect the position and speed of an object according to a frequency modulated continuous wave (FM-CW) method.

The finder 14 is a light detection and ranging (LIDAR) device. The finder 14 radiates light to the surroundings of the host vehicle M and measures scattering light. The finder 14 detects a distance to a target on the basis of a time from light emission to light reception. Radiated light may be pulse-shaped laser light, for example. The finder 14 is attached to any portion of the host vehicle M.

The object recognition device 16 performs a sensor fusion process on detection results of some or all of the camera 10, the radar device 12 and the finder 14 to recognize the position, type, speed and the like of an object. The object recognition device 16 outputs a recognition result to the automated driving control device 100. The object recognition device 16 may output detection results of the camera 10, the radar device 12 and the finder 14 to the automated driving control device 100 as they are. The object recognition device 16 may be omitted from the vehicle system 1.

The communication device 20 communicates with other vehicles around the host vehicle M using a cellular network, a Wi-Fi network, Bluetooth (registered trademark), dedicated short range communication (DSRC), and the like, for example, or communicates with various server devices through a wireless base station.

The HMI 30 presents various types of information to an occupant of the host vehicle M and receives an input operation from the occupant. The HMI 30 includes various display devices, speakers, buzzers, touch panels, switches, keys, etc.

The vehicle sensor 40 includes a vehicle speed sensor that detects the speed of the host vehicle M, an acceleration sensor that detects an acceleration, a yaw rate sensor that detects an angular velocity around a vertical axis, a heading sensor that detects the direction of the host vehicle M, etc.

The navigation device 50 may include a global navigation satellite system (GNSS) receiver 51, a navigation HMI 52 and a route determiner 53, for example. The navigation device 50 stores first map information 54 in a storage device such as a hard disk drive (HDD) or a flash memory. The GNSS receiver 51 identifies the position of the host vehicle M on the basis of signals received from a GNSS satellite. The position of the host vehicle M may be identified or complemented by an inertial navigation system (INS) using the output of the vehicle sensor 40. The navigation HMI 52 includes a display device, a speaker, a touch panel, keys, etc. Part or all of the navigation HMI 52 and the aforementioned HMI 30 may be made to be common. The route determiner 53 determines a route (hereinafter, a route on a map) to a destination input by an occupant using the navigation HMI 52 from the position of the host vehicle M identified by the GNSS receiver 51 (or any input position) with reference to the first map information 54, for example. The first map information 54 may be information representing road shapes according to links indicating roads and nodes connected by links, for example. The first map information 54 may include curvatures and point-of-interest (POI) information of roads, and the like.

A route on a map is output to the MPU 60. The navigation device 50 may perform route guide using the navigation HMI 52 on the basis of roads on a map. For example, the navigation device 50 may be realized by functions of a terminal device such as a smartphone or a tablet terminal possessed by an occupant. The navigation device 50 may transmit a current position and a destination to a navigation server through the communication device 20 and acquire the same route as a route on a map from the navigation server.

The MPU 60 includes a recommended lane determiner 61, for example, and stores second map information 62 in a storage device such as an HDD or a flash memory. The recommended lane determiner 61 divides a route on a map provided from the navigation device 50 into a plurality of blocks (divides the route into intervals of 100 m in a vehicle traveling direction, for example) and determines a recommended lane for each block with reference to the second map information 62. The recommended lane determiner 61 performs determination in such a manner that on which lane from the left the vehicle will travel is determined. When a route on a map includes a branch point, the recommended lane determiner 61 determines recommended lanes such that the host vehicle M can travel on a reasonable route for traveling to a branch destination.

The second map information 62 is map information with higher-accuracy than the first map information 54. For example, the second map information 62 may include information on the centers of lanes, information on the boundaries of lanes, or the like. The second map information 62 may include road information, traffic regulations information, address information (addresses and zip codes), facility information, telephone number information, etc. The second map information 62 may be updated at any time through communication between the communication device 20 and other devices.

The speaker 70 operates according to control of the automated driving control device 100 and outputs sound. This sound includes audio for notifying an occupant of the host vehicle M of approaching of an emergency vehicle, and the like. Details notified of by the speaker 70 will be described later in detail. The speaker 70 is an example of a "notificator."

The driving operator 80 may include an accelerator pedal, a brake pedal, a shift lever, a steering wheel, a modified steering wheel, a joystick, a winker lever, a microphone, various switches, and the like, for example. A sensor that detects an operation amount or presence or absence of an operation is attached to the driving operator 80 and a detection result thereof is output to the automated driving control device 100 or some or all of the travel driving power output device 200, the brake device 210 and the steering device 220.

The automated driving control device 100 may include a first controller 120, a second controller 160 and a storage 180, for example. Each of the first controller 120 and the second controller 160 may be realized by a hardware processor such as a central processing unit (CPU) executing a program (software), for example. Some or all of these components may be realized by hardware (circuit unit; including circuitry) such as a large scale integration (LSI) circuit, an application specific integrated circuit (ASIC), a field-programmable gate array (FPGA) and a graphics processing unit (GPU) or realized by software and hardware in cooperation. Programs may be stored in advance in a storage device of the storage 180, such as an HDD or a flash memory, or stored in a detachable storage medium such as a DVD or a CD-ROM and installed in the HDD or the flash memory of the automated driving control device 100 by setting the storage medium in a drive device.

Figure 2:
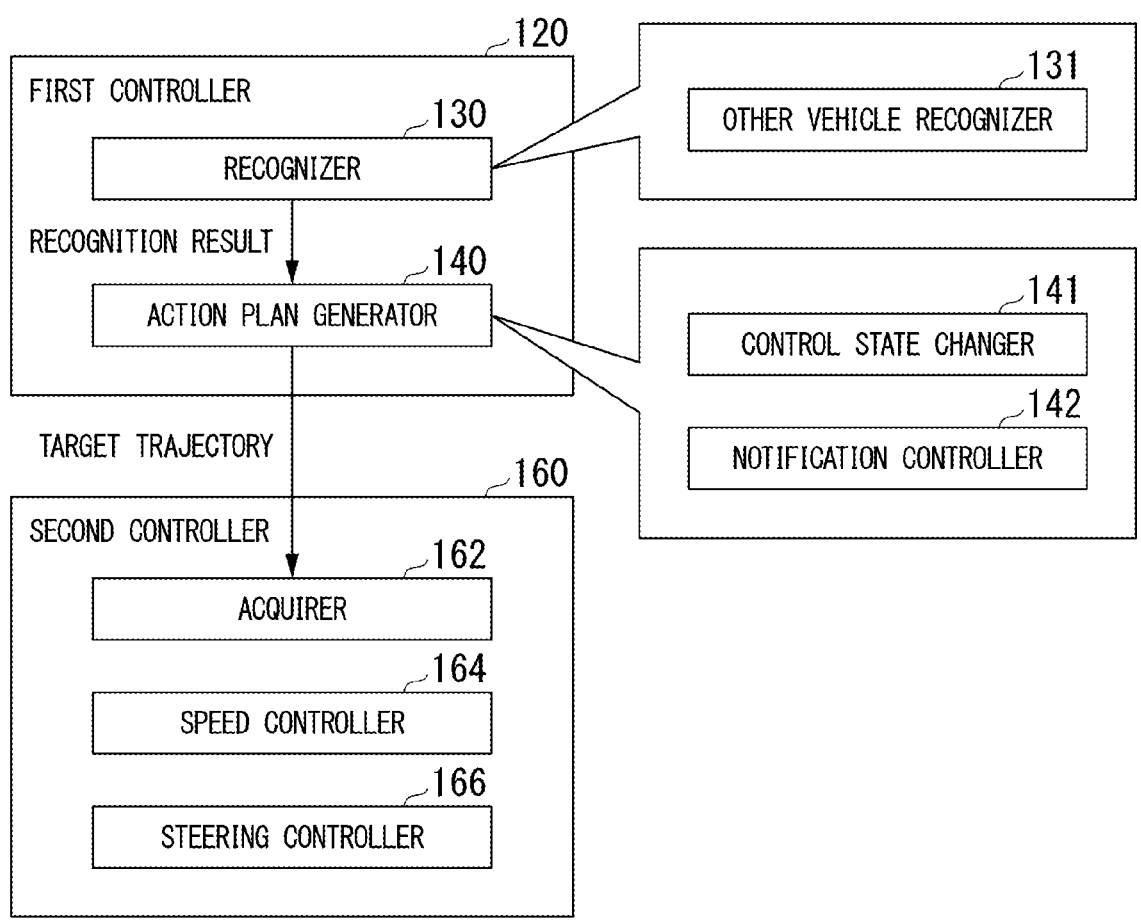
FIG. 2 is a functional block diagram of a first controller and a second controller.

FIG. 2 is a functional block diagram of the first controller 120 and the second controller 160. The first controller 120 may include a recognizer 130 and an action plan generator 140, for example. The first controller 120 may realize a function using artificial intelligence (AI) and a function using a model provided in advance in parallel, for example. For example, a function of "recognizing an intersection" may be realized by performing recognition of an intersection using deep learning or the like and recognition based on conditions provided in advance (which include a signal which can be pattern-matched, road markings and the like) in parallel and assigning scores to both the recognitions to integrally evaluate the recognitions. Accordingly, reliability of automated driving is secured.

The recognizer 130 recognizes states such as the position, speed and acceleration of an object around the host vehicle M on the basis of information input from the camera 10, the radar device 12 and the finder 14 through the object recognition device 16. The object includes another vehicle. For example, the position of an object may be recognized as a position on absolute coordinates having a representative point (the center of gravity, the center of the drive shaft or the like) of the host vehicle M as the origin and used for control. The position of an object may be represented as a representative point of the object, such as the center of gravity or a corner, or may be represented as a representative region. "States" of an object may include the acceleration and jerk of the object or an "action state" (e.g., whether lane change is being performed or is intended to be performed).

The recognizer 130 may recognize a lane (traveling lane) in which the host vehicle M is traveling, for example. For example, the recognizer 130 may recognize a traveling lane by comparing a lane marking pattern (e.g., arrangement of solid lines and dashed lines) obtained from the second map information 62 with a lane marking pattern around the host vehicle M recognized from an image captured by the camera 10. The recognizer 130 may recognize a traveling lane by recognizing traveling course boundaries (road boundaries) including lane markings, road shoulders, curbs, medians, guardrails and the like as well as lane markings. In such recognition, the position of the host vehicle M acquired from the navigation device 50 and a processing result of the INS may be additionally taken into account. The recognizer 130 recognizes stop lines, obstacles, a red signal, tollgates, and other road states.

The recognizer 130 recognizes a position and an attitude of the host vehicle M with respect to a traveling lane when the traveling lane is recognized. For example, the recognizer 130 may recognize a distance between a representative point of the host vehicle M and the center of the lane and an angle between a traveling direction of the host vehicle M and a line connecting the center of the lane as a relative position and attitude of the host vehicle M with respect to the traveling lane. Instead of this, the recognizer 130 may recognize the position of the representative point of the host vehicle M or the like with respect to any side edge of the traveling lane (a lane marking or a road boundary) as a relative position of the host vehicle M with respect to the traveling lane.

The recognizer 130 may further include another vehicle recognizer 131. The other vehicle recognizer 131 recognizes operations of other vehicles traveling around the host vehicle M on the basis of images captured by the camera 10.

The action plan generator 140 generates a target trajectory through which the host vehicle M will automatically travel (without depending on an operation of a driver) in the future such that the host vehicle M travels in a recommended lane determined by the recommended lane determiner 61 in principle and can cope with a surrounding situation thereof. For example, a target trajectory may include a speed factor. For example, a target trajectory is represented as a sequential arrangement of points (trajectory points) at which the host vehicle M will arrive. A trajectory point is a point at which the host vehicle M will arrive for each predetermined traveling distance (e.g., approximately several meters) in a distance along a road, and a target speed and a target acceleration for each predetermined sampling time (e.g., approximately every several tenths of a second) are generated as a part of a target trajectory apart from trajectory points. A trajectory point may be a position at which the host vehicle M will arrive at a sampling time for each predetermined sampling time. In this case, information on a target speed and a target acceleration are represented by a spacing between trajectory points.

The action plan generator 140 may set an automated driving event upon generation of a target trajectory. Automated driving events include a constant-speed travel event, a low-speed following travel event of following a preceding vehicle at a speed equal to or lower than a predetermined vehicle speed (e.g., 60 [km]), a lane change event, a branch event, a merging event, a takeover event, and the like. The action plan generator 140 generates a target trajectory in response to a started event.

The action plan generator 140 includes a control state changer 141 and a notification controller 142.

The control state changer 141 causes the host vehicle M to operate in at least one of a first driving state and a second driving state. The first driving state is a driving state in which a task of keeping eyes forward is assigned to at least a driver. In the description below, it is assumed that the first driving state is a driving state in which a task of holding a steering wheel 82 and a task of keeping eyes forward are assigned to a driver as needed. The second driving state is a driving state in which tasks assigned to a driver are reduced compared to the first driving state (that is, a rate of automation is higher than the first driving state). For example, the first driving state is low-level automated driving and is a driving state in which a task of holding the steering wheel 82 is assigned to a driver. The second driving state is automated driving of a higher level than the first driving state and is a driving state in which a task of holding the steering wheel 82 is not assigned to a driver and a task of keeping eyes forward is assigned to the driver or a driving state (of automated driving level 2, category B2, for example) in which the task of holding the steering wheel 82 and the task of keeping eyes forward are not assigned to the driver.

The control state changer 141 maintains the second driving state even when a state in which a driver actually places hands on (i.e., holds) the steering wheel 82 in a hands-off state in which the task of holding the steering wheel 82 is not assigned is recognized (detected). When the first driving state is a state in which a driver performs manual driving or a state in which an advanced driver assistance system (ADAS) is operated, the second driving state may be a state in which automated driving is performed. The ADAS is a driver assistance system represented by an adaptive cruise control system (ACC) or a lane keeping assist system (LKAS).

The control state changer 141 changes a driving state of the host vehicle M to the first driving state on the basis of a distance between a following four-wheeled vehicle mr1 recognized by the other vehicle recognizer 131 and the host vehicle M when the host vehicle M is operating in the second driving state. When the host vehicle M is operating in the first driving state, the control state changer 141 changes the driving state to the second driving state of the host vehicle M on the basis of a distance between the following four-wheeled vehicle mr1 recognized by the other vehicle recognizer 131 and the host vehicle M. A processing of causing the driving state of the host vehicle M from the second driving state to the first driving state and predetermined conditions for returning the driving state to the second driving state from the first driving state will be described in detail later.

The notification controller 142 performs a notification for requesting avoidance control for avoiding an emergency vehicle for a driver of the host vehicle M when a recognition result of the other vehicle recognizer 131 represents that the emergency vehicle has approached after the driving state of the host vehicle M has changed to the first driving state by the control state changer 141.

The second controller 160 controls the travel driving power output device 200, the brake device 210 and the steering device 220 such that the host vehicle M passes through a target trajectory generated by action plan generator 140 on scheduled time.

For example, the second controller 160 may include an acquirer 162, a speed controller 164 and a steering controller 166. The acquirer 162 acquires information on a target trajectory (trajectory points) generated by the action plan generator 140 and stores the information in a memory (not shown). The speed controller 164 controls the travel driving power output device 200 or the brake device 210 on the basis of a speed factor belonging to the target trajectory stored in the memory. The steering controller 166 controls the steering device 220 in response to a degree of bending of the target trajectory stored in the memory. Processing of the speed controller 164 and the steering controller 166 may be realized by feedforward control and feedback control in combination, for example. As an example, the steering controller 166 performs feedforward control according to a curvature of a road ahead of the host vehicle M and feedback control based on a distance from a target trajectory in combination. A combination of the control state changer 141 and the second controller 160 is an example of a "driving controller."

The travel driving power output device 200 outputs a travel driving power (torque) for traveling of a vehicle to driving wheels. For example, the travel driving power output device 200 may include a combination of an internal combustion engine, a motor, a transmission and the like, and an ECU which controls these components. The ECU controls the aforementioned components according to information input from the second controller 160 or information input from the driving operator 80.

The brake device 210 may include a brake caliper, a cylinder which transfers a hydraulic pressure to the brake caliper, an electric motor which generates a hydraulic pressure in the cylinder, and a brake ECU, for example. The brake ECU controls the electric motor according to information input from the second controller 160 and information input from the driving operator 80 such that a brake torque according to the control operation is output to each vehicle wheel. The brake device 210 may include a mechanism for transferring a hydraulic pressure generated by an operation of the brake pedal included in the driving operator 80 to the cylinder through a master cylinder as a backup. The brake device 210 is not limited to the above-described configuration and may be an electronically controlled hydraulic brake device which controls an actuator according to information input from the second controller 160 and transfers a hydraulic pressure of a master cylinder to a cylinder.

The steering device 220 may include a steering ECU and an electric motor, for example. For example, the electric motor may change the direction of the steering wheel by applying a force to a rack-and-pinion mechanism. The steering ECU drives the electric motor according to information input from the second controller 160 or information input from the driving operator 80 to change the direction of the steering wheel.

[With Respect to Change of Driving State]

Hereinafter, details of processes performed by the control state changer 141 will be described. First, when an emergency vehicle has approached from behind while the host vehicle M is traveling, it is desirable that the host vehicle M be offset to either side in the vehicle width direction and travel such that it does not obstruct traveling of the emergency vehicle. An emergency vehicle is a vehicle that needs to travel with priority over general vehicles, such as an ambulance, a police vehicle, and a fire engine, for example, and a vehicle having a siren or a lamp representing that there is an emergency vehicle. However, there are cases in which control for traveling while preventing interference with neighboring general vehicles while being offset to clear a traveling path for an emergency vehicle has a high level of difficulty in automated driving, and a necessity of rapid overtaking and a necessity of traveling in an area (e.g., a road shoulder) other than that of a traveling course without having approval of a driver may arise in some cases. Accordingly, when it is determined that an emergency vehicle is approaching from behind while the host vehicle M is traveling on the basis of movement of a following vehicle in the vehicle width direction, the host vehicle M changes to the first state in which holding of the steering wheel 82 is requested, as described above. Accordingly, the host vehicle M can more rapidly prepare for approach of an emergency vehicle.

[In Case of Changing from Second Driving State to First Driving State]

When the host vehicle M is operating in the second driving state, for example, the control state changer 141 changes to the first state when there is no following four-wheeled vehicle mr1 (condition 1) or a distance from the following four-wheeled vehicle mr1 in the vehicle width direction is equal to or greater than a predetermined distance (condition 2). Hereinafter, each condition will be described in detail.

[With Respect to (Condition 1)]

Figure 3:
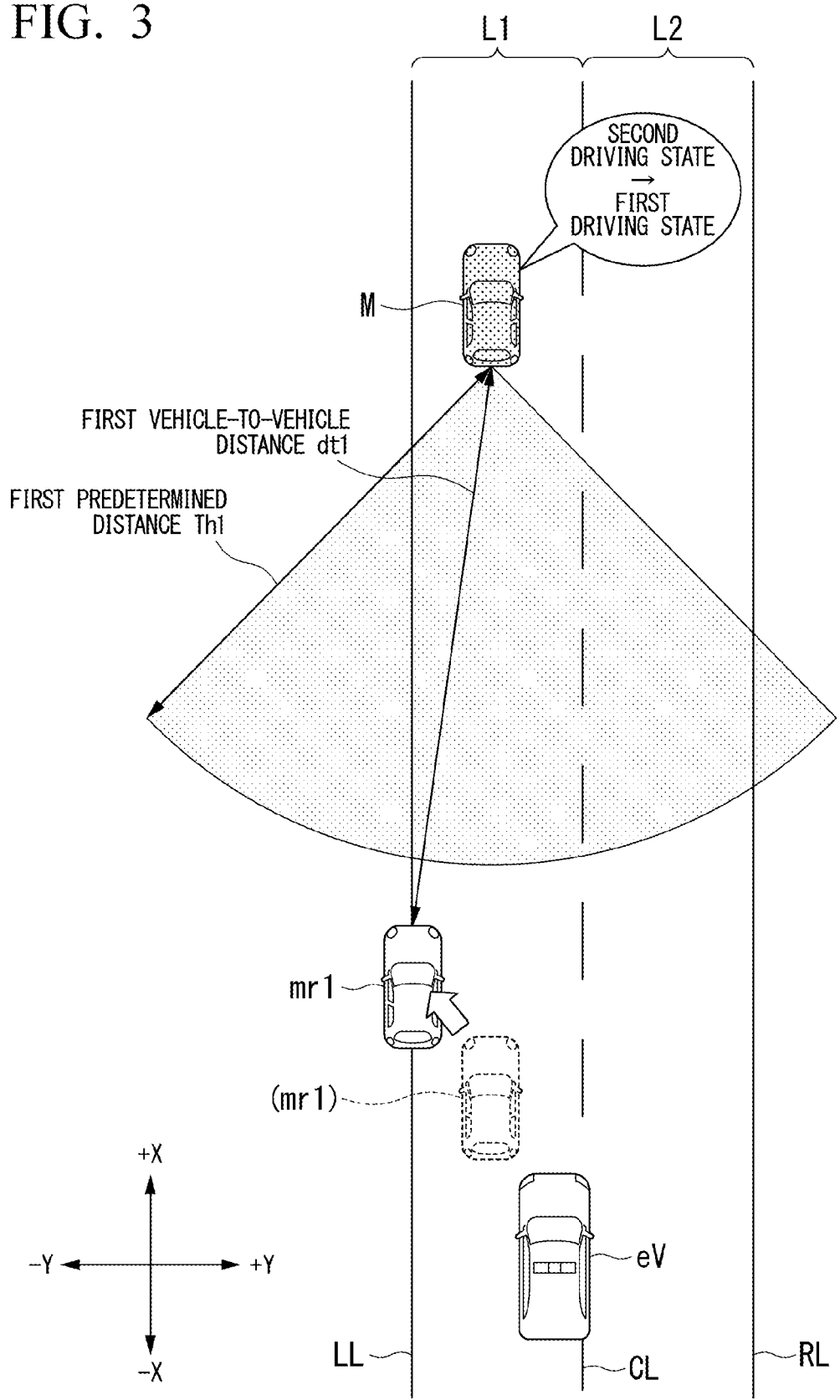
FIG. 3 is a diagram showing an example of a state in which change of driving states of (condition 1) according to the first embodiment is performed.

FIG. 3 is a diagram showing an example of a state in which change of driving state of (condition 1) according to the first embodiment is performed. In the description below, X represents an extending direction of a road and Y represents a vehicle width direction perpendicular to the X direction. The +X direction represents a traveling direction of the host vehicle M, the −X direction represents behind the host vehicle M, the −Y direction represents the left-hand direction with respect to the traveling direction of the host vehicle M, and the +Y direction represents the right-hand direction with respect to the traveling direction of the host vehicle M.

In FIG. 3, a first lane L1 is a lane defined by a lane marking LL and a lane marking CL and a lane in which a vehicle advancing in the +X direction travels. A second lane L2 is a lane defined by the lane marking CL and a lane marking RL and an opposite lane (i.e., a lane in which a vehicle advancing in the −X direction travels) with respect to the first lane L1.

The other vehicle recognizer 131 may recognize presence or absence of the following four-wheeled vehicle mr1, for example. For example, the other vehicle recognizer 131 may recognize absence of the following four-wheeled vehicle mr1 when the following four-wheeled vehicle mr1 is not present within a range in which a distance between the following four-wheeled vehicle mr1 and the host vehicle M in the X direction (hereinafter, a first vehicle-to-vehicle distance dt1) is equal to or less than a first predetermined distance Th1 and recognize presence of the following four-wheeled vehicle mr1 when the following four-wheeled vehicle mr1 is present within the range in which the first vehicle-to-vehicle distance dt1 is equal to or less than the first predetermined distance Th1. When the following four-wheeled vehicle mr1 is not present, the control state changer 141 changes to the first state from the second state.

It may be determined that an emergency vehicle eV is traveling between the first lane L1 and the second lane L2, for example, and the following four-wheeled vehicle mr1 stops on the left road shoulder in a state in which it has been traveling in the first lane L1 (the illustrated state of the following four-wheeled vehicle (mr1)) in order to avoid the emergency vehicle eV and stops to clear a traveling path for the emergency vehicle eV. In this case, since the other vehicle recognizer 131 recognizes that the following four-wheeled vehicle mr1 is not present, the control state changer 141 can change to the first state from the second state such that the driver prepares for approach of the emergency vehicle eV.

The first predetermined distance Th1 may be changed to a value in response to the speed of the host vehicle M, for example. FIG. 4 is a diagram showing an example of correspondence between the speed of the host vehicle M and the first predetermined distance Th1. For example, the first predetermined distance Th1 may be set to a longer distance as the speed of the host vehicle M increases and set to a shorter distance as the speed of the host vehicle M decreases. In the example shown in FIG. 4, the first predetermined distance Th1 is set to 100 [m] when the speed of the host vehicle M is equal to or greater than 100 [km/h], 80 [m] when the speed of the host vehicle M is less than 100 [km/h] and equal to or greater than 70 [km/h], 60 [m] when the speed of the host vehicle M is less than 70 [km/h] and equal to or greater than 30 [km/h], and 30 [m] when the speed of the host vehicle M is less than 30 [km/h]. This correspondence between the speed of the host vehicle M and the first predetermined distance Th1 is an example, the present invention is not limited thereto, and the first predetermined distance Th1 may be set to a value in linear proportion to the speed of the host vehicle M, for example.

[With Respect to (Condition 2)]

Figure 5:
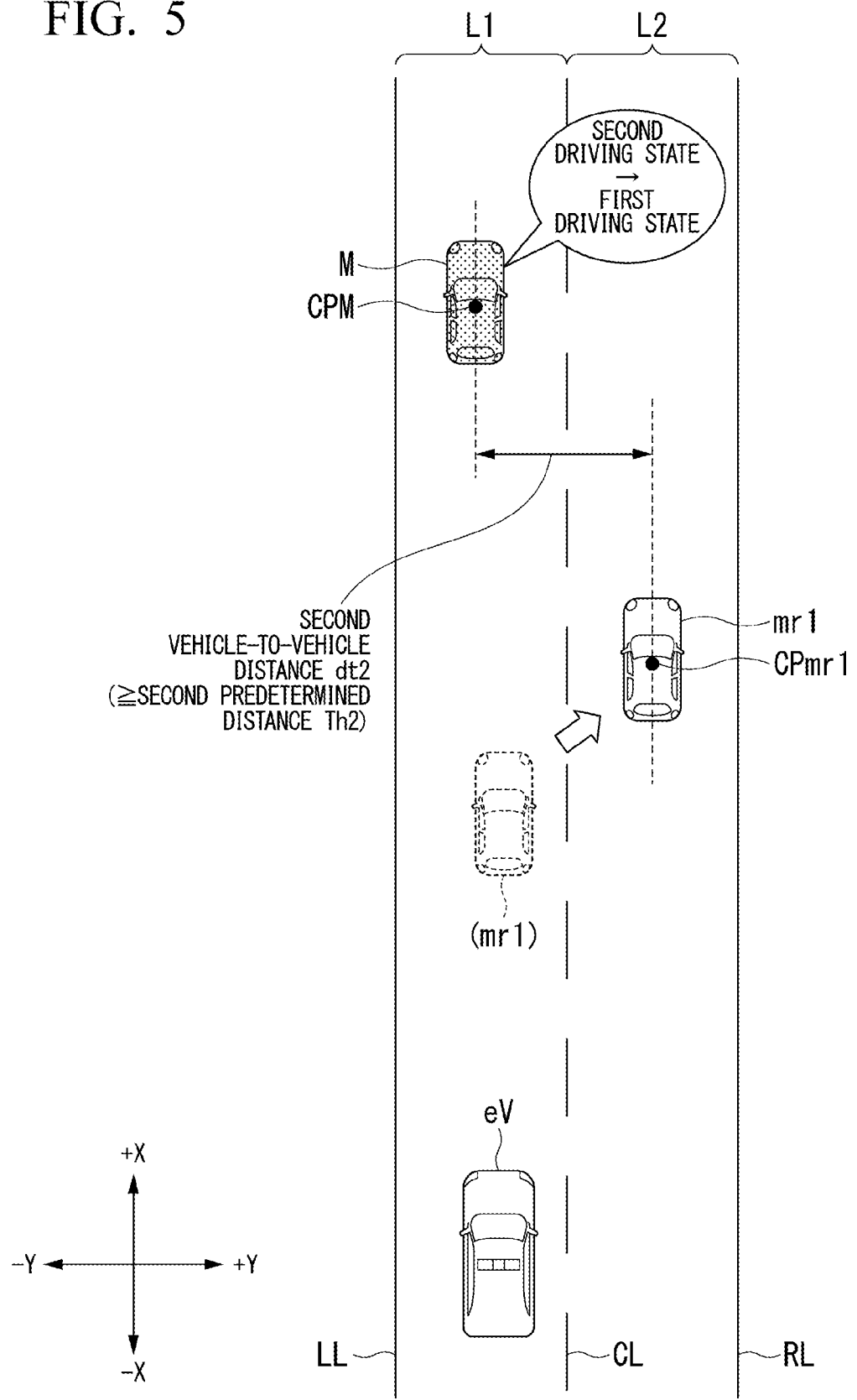
FIG. 5 is a diagram showing an example of a state in which change of driving states of (condition 2) according to the first embodiment is performed.

FIG. 5 is a diagram showing an example of a state in which change of driving state of (condition 2) according to the first embodiment is performed. In FIG. 5, the first lane L1 and the second lane L2 are lanes in which a vehicle advancing in the +X direction travels. The other vehicle recognizer 131 may recognize a distance (hereinafter, a second vehicle-to-vehicle distance dt2) from the following four-wheeled vehicle mr1 in the vehicle width direction (illustrated Y direction), for example. For example, the second vehicle-to-vehicle distance dt2 may be a distance between the center CPM of the host vehicle M and the center CPmr1 of the following four-wheeled vehicle mr1 in the vehicle width direction. The control state changer 141 may changes to the first state from the second state, for example, when the second vehicle-to-vehicle distance dt2 recognized (acquired) by the other vehicle recognizer 131 is equal to or greater than a second predetermined distance Th2. For example, the second predetermined distance Th2 may be a distance between the center CPM of the host vehicle M and the center CPmr1 of the following four-wheeled vehicle mr1 in the vehicle width direction, which is a degree to which the following four-wheeled vehicle mr1 has moved to a neighboring lane.

It may be determined that the emergency vehicle eV is traveling in the first lane L1, for example, and the following four-wheeled vehicle mr1 has moved to the right lane in order to avoid the emergency vehicle eV and has cleared a traveling path for the emergency vehicle eV. In this case, since the other vehicle recognizer 131 recognizes that the following four-wheeled vehicle mr1 has moved from the lane of the host vehicle M, the control state changer 141 changes to the first state from the second state.

The second vehicle-to-vehicle distance dt2 may be a distance between a travel trajectory that connects positions through which the host vehicle M has traveled so far and the center CPmr1 of the following four-wheeled vehicle mr1 instead of the distance between the center CPM of the host vehicle M and the center CPmr1 of the following four-wheeled vehicle mr1.

[In Case of Causing State to be Changeable from Second Driving State to First Driving State]

When the host vehicle M is operating in the first driving state, for example, the control state changer 141 may change to the first state from the second state if the following four-wheeled vehicle mr1 is present within a predetermined distance (condition 3). Hereinafter, (condition 3) will be described in detail.

[With Respect to (Condition 3)]

Figure 6:
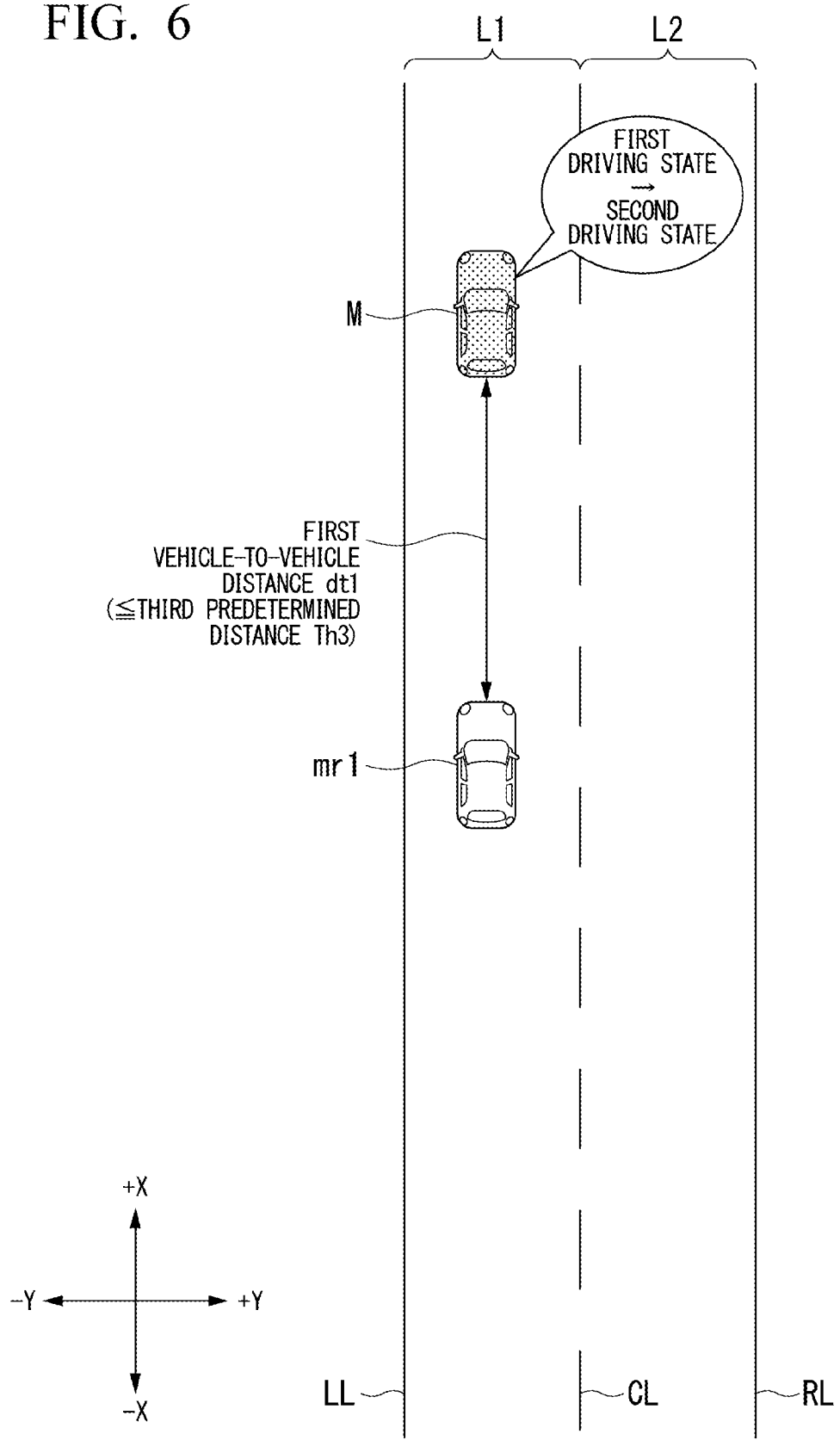
FIG. 6 is a diagram showing an example of a state in which change of driving states of (condition 3) according to the first embodiment is performed.

FIG. 6 is a diagram showing an example of a state in which change of driving state of (condition 3) according to the first embodiment is performed. For example, the other vehicle recognizer 131 may recognize the first vehicle-to-vehicle distance dt1 between the host vehicle M and the following four-wheeled vehicle mr1. The control state changer 141 changes the state of the host vehicle between the first driving state and the second driving state when the first vehicle-to-vehicle distance dt1 recognized (acquired) by the other vehicle recognizer 131 is within a third predetermined distance Th3, for example. The third predetermined distance Th3 may be a distance of a degree of an appropriate vehicle-to-vehicle distance which can be obtained when the following four-wheeled vehicle mr1 follows the host vehicle M, for example.

It may be determined that the following four-wheeled vehicle mr1 is following the host vehicle M with a predetermined vehicle-to-vehicle distance from the host vehicle M without moving to a road shoulder or a neighboring lane (i.e., in the vehicle width direction) when the emergency vehicle eV is not present behind the host vehicle M or the following four-wheeled vehicle mr1, for example. In this case, since the emergency vehicle eV is not present, the control state changer 141 causes the host vehicle M to be in a state of being able to change from the first driving state to the second driving state.

[Condition for Starting Change Process]

Figure 7:
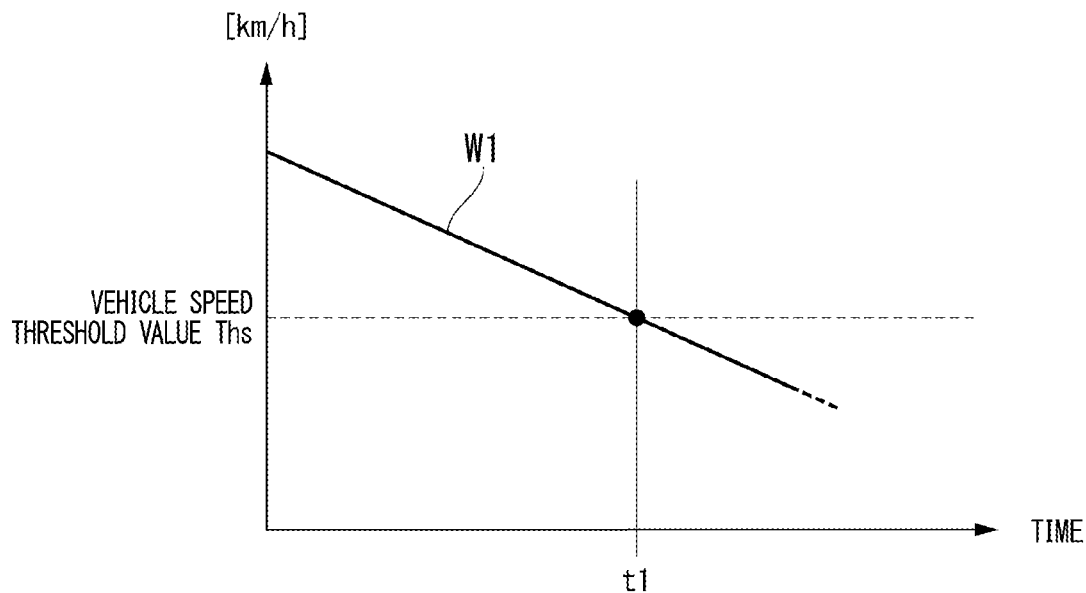
FIG. 7 is a diagram schematically showing a condition for starting a process of causing a state to be changeable from a first driving state to a second driving state.

When a starting condition for starting a process of causing the host vehicle to be in a state of being able to change from the first driving state to the second driving state (i.e., a process of determining whether (condition 3) is satisfied) is satisfied, the control state changer 141 may execute this process and, when the starting condition is not satisfied, prevent execution of this process. FIG. 7 is a diagram schematically showing a condition for starting the process of causing a state to be changeable from the first driving state to the second driving state. In FIG. 7, the vertical axis represents the speed of the host vehicle M, the horizontal axis represents time, and a waveform W1 is a waveform representing change in the speed of the host vehicle M over time.

In the example of FIG. 7, the waveform W1 represents that the speed of the host vehicle M decreases with the elapse of time. When the current driving state is the first driving state, for example, the control state changer 141 prevents execution of the process of causing a state to be changeable from the first driving state to the second driving state when the speed of the host vehicle M recognized by the recognizer 130 is equal to or greater than a predetermined threshold value (hereinafter, a vehicle speed threshold value Ths) and does not prevent execution of the process of causing a state to be changeable from the first driving state to the second driving state when the speed of the host vehicle M is less than the vehicle speed threshold value Ths. Accordingly, in the example shown in FIG. 7, the control state changer 141 prevents execution of the process of causing a state to be changeable from the first driving state to the second driving state until a time t1 at which the speed of the host vehicle M becomes less than the vehicle speed threshold value Ths.

The other vehicle recognizer 131 recognizes the first vehicle-to-vehicle distance dt1 from the following four-wheeled vehicle mr1 even when the speed of the host vehicle M is equal to or greater than the vehicle speed threshold value Ths. Accordingly, the control state changer 141 can immediately execute the process of causing a state to be changeable from the first driving state to the second driving state at a timing at which the speed of the host vehicle M recognized by the recognizer 130 has become less than the vehicle speed threshold value Ths.

[With Respect to Notification Process of Notification Controller 142]

The notification controller 142 notifies the driver that the driving state of the host vehicle M has changed from the second driving state to the first driving state or from the second driving state to the first driving state by the control state changer 141, for example. For example, the notification controller 142 may cause the speaker 70 to output audio information for notification of driving state change through audio to notify the driver of the host vehicle M that the driving state has changed. Audio information output when the second driving state has changed to the first driving state may include information representing audio such as "Driving state has changed. Please pay attention to the surrounding situation because an emergency vehicle may approach," for example. The aforementioned audio is an example and the present invention is not limited thereto. Other sounds or audio may be used if the driver of the host vehicle M can be notified of driving state change through the sounds or audio. Notification is not limited to notification using audio and notification may be performed using light emission, display, vibration, and the like.

[Operation Flow]

Figure 8:
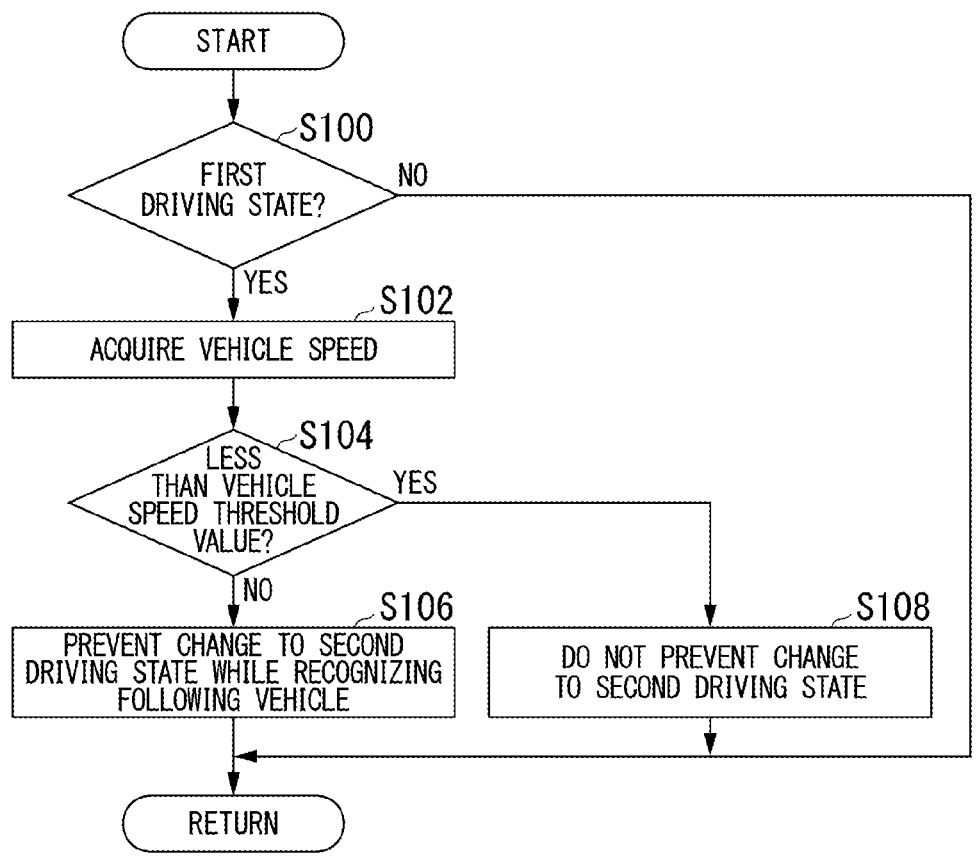
FIG. 8 is a diagram showing an example of a flowchart pertaining to starting of a process of causing a state to be changeable from the first driving state to the second driving state of the first embodiment.

FIG. 8 is a diagram showing an example of a flowchart pertaining to starting of the process of causing a state to be changeable from the first driving state to the second driving state according to the first embodiment. The processes shown in FIG. 8 may be repeatedly executed at predetermined timings. First, the control state changer 141 determines whether a current driving state is the first driving state (step S100). The control state changer 141 acquires the speed of the host vehicle M recognized by the recognizer 130 when the current driving state is the first driving state (step S102). The control state changer 141 determines whether the recognized speed of the host vehicle M is less than the vehicle speed threshold value Ths (step S104). The control state changer 141 prevents execution of the process of causing a state to be changeable from the first driving state to the second driving state while recognizing the following four-wheeled vehicle mr1 when the recognized speed of the host vehicle M is equal to or greater than the vehicle speed threshold value Ths (step S106). The control state changer 141 does not prevent execution of the process of causing a state to be changeable from the first driving state to the second driving state when the recognized speed of the host vehicle M is not equal to or less than the vehicle speed threshold value Ths (step S108).

Figure 9:
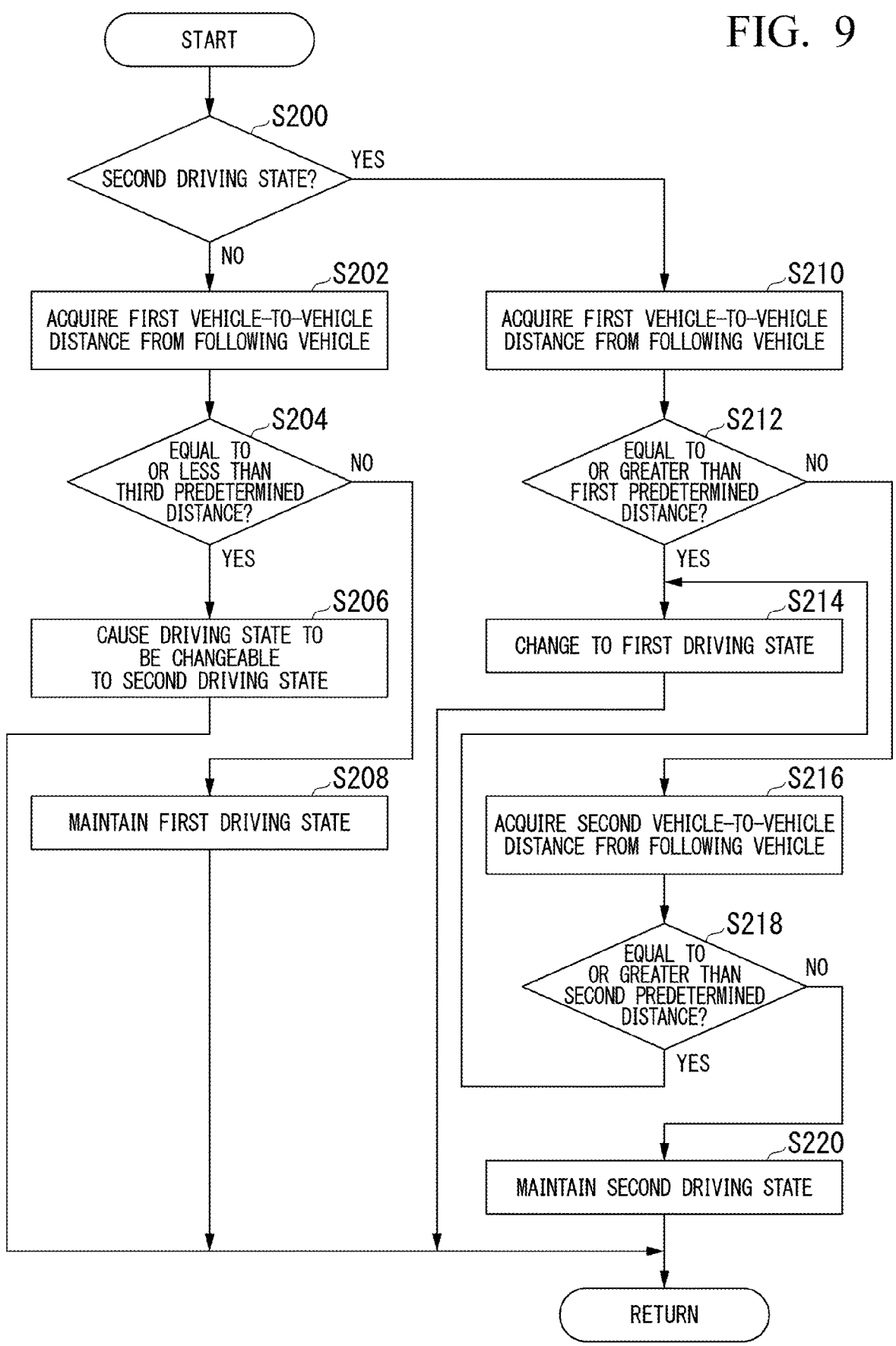
FIG. 9 is a flowchart showing an example of a series of processes of an automated driving control device according to the first embodiment.

FIG. 9 is a flowchart showing an example of a series of processes of the automated driving control device 100 according to the first embodiment. The processes shown in FIG. 9 may be repeatedly executed at predetermined timings. First, the control state changer 141 determines whether a current driving state is the second driving state (step S200). The control state changer 141 acquires the first vehicle-to-vehicle distance dt1 between the following four-wheeled vehicle mr1 recognized by the other vehicle recognizer 131 and the host vehicle M when it is determined that the current driving state is the first driving state (step S202).

The control state changer 141 determines whether the acquired first vehicle-to-vehicle distance dt1 is equal to or less than the third predetermined distance Th3 (step S204). The control state changer 141 determines that (condition 3) has been satisfied and causes the driving state to be a state changeable from the first driving state to the second driving state when the first vehicle-to-vehicle distance dt1 is equal to or less than the third predetermined distance Th3 (step S206). The process of step S206 is executed when execution of the process of causing a state to be changeable from the first driving state to the second driving state is not prevented in the process shown in FIG. 8. The control state changer 141 determines that (condition 3) has not been satisfied and maintains the driving state as the first driving state when the first vehicle-to-vehicle distance dt1 is longer than the third predetermined distance Th3 (step S208).

The control state changer 141 acquires the first vehicle-to-vehicle distance dt1 between the following four-wheeled vehicle mr1 recognized by the other vehicle recognizer 131 and the host vehicle M when the current driving state is the second driving state (step S210). The control state changer 141 may acquire the first vehicle-to-vehicle distance dt1, for example, when the following four-wheeled vehicle mr1 is the same vehicle (that is, the following four-wheeled vehicle mr1 has not changed due to route change or lane change). The control state changer 141 may re-execute the processes shown in FIG. 9 when the following four-wheeled vehicle mr1 has changed after the first vehicle-to-vehicle distance dt1 is acquired. The control state changer 141 determines whether the acquired first vehicle-to-vehicle distance dt1 can be obtained and the acquired first vehicle-to-vehicle distance dt1 is equal to or greater than the first predetermined distance Th1 (step S212).

The control state changer 141 determines that (condition 1) has been satisfied (i.e., there is no following four-wheeled vehicle mr1) and changes the driving state from the second driving state to the first driving state when the first vehicle-to-vehicle distance dt1 is equal to or greater than the first predetermined distance Th1 (step S214). The control state changer 141 determines whether the second vehicle-to-vehicle distance dt2 in the vehicle width direction between the following four-wheeled vehicle mr1 and the host vehicle M is equal to or greater than the second predetermined distance Th2 when the first vehicle-to-vehicle distance dt1 is less than the first predetermined distance Th1 (step S218). The control state changer 141 determines that (condition 2) has been satisfied (i.e., the following four-wheeled vehicle mr1 has moved to a neighboring lane) and changes the driving state from the second driving state to the first driving state when the second vehicle-to-vehicle distance dt2 is equal to or greater than the second predetermined distance Th2 (step S214). The control state changer 141 maintains the driving state as the second driving state when the second vehicle-to-vehicle distance dt2 is less than the second predetermined distance Th2 (step S220).

When the second vehicle-to-vehicle distance dt2 is equal to or greater than the second predetermined distance Th2, the control state changer 141 may change the driving state to a driving state in which higher level tasks are assigned to the driver (e.g., automated driving level 2, Category B1) because emergency driving is more likely to be required. In this case, the notification controller 142 may perform more intensive notification with respect to change of driving for the driver. Although a case in which all of determination of (condition 1) to (condition 3) is performed has been described in the flowchart shown in FIG. 9, the present invention is not limited thereto. At least one of the process pertaining to (condition 1) (i.e., steps S210 to S214), the process pertaining to (condition 2) (i.e., steps S216 to S220) and the process pertaining to (condition 3) (i.e., steps S202 to S208) in the flowchart shown in FIG. 9 may be performed.

Summary of First Embodiment

As described above, according to the automated driving control device 100 of the present embodiment, it is possible to prepare for approach of the emergency vehicle eV more rapidly by changing a driving state to the first driving state or maintaining the driving state on the basis of a behavior of the following four-wheeled vehicle mr1 determined when the emergency vehicle eV has approached. According to the automated driving control device 100 of the present embodiment, it is possible to cause the host vehicle M to travel according to automated driving of a higher level by changing a driving state to the second driving state or maintaining the driving state on the basis of a behavior of the following four-wheeled vehicle mr1 determined when the emergency vehicle eV is not approaching.

Modified Example 1

Hereinafter, Modified Example 1 according to the first embodiment will be described with reference to the drawings. In Modified Example 1, a case in which a driving state of the host vehicle M is changed on the basis of whether a following vehicle is a two-wheeled vehicle will be described. Components the same as those in the above-described embodiment are denoted by the same reference signs and description thereof is omitted.

Figure 10:
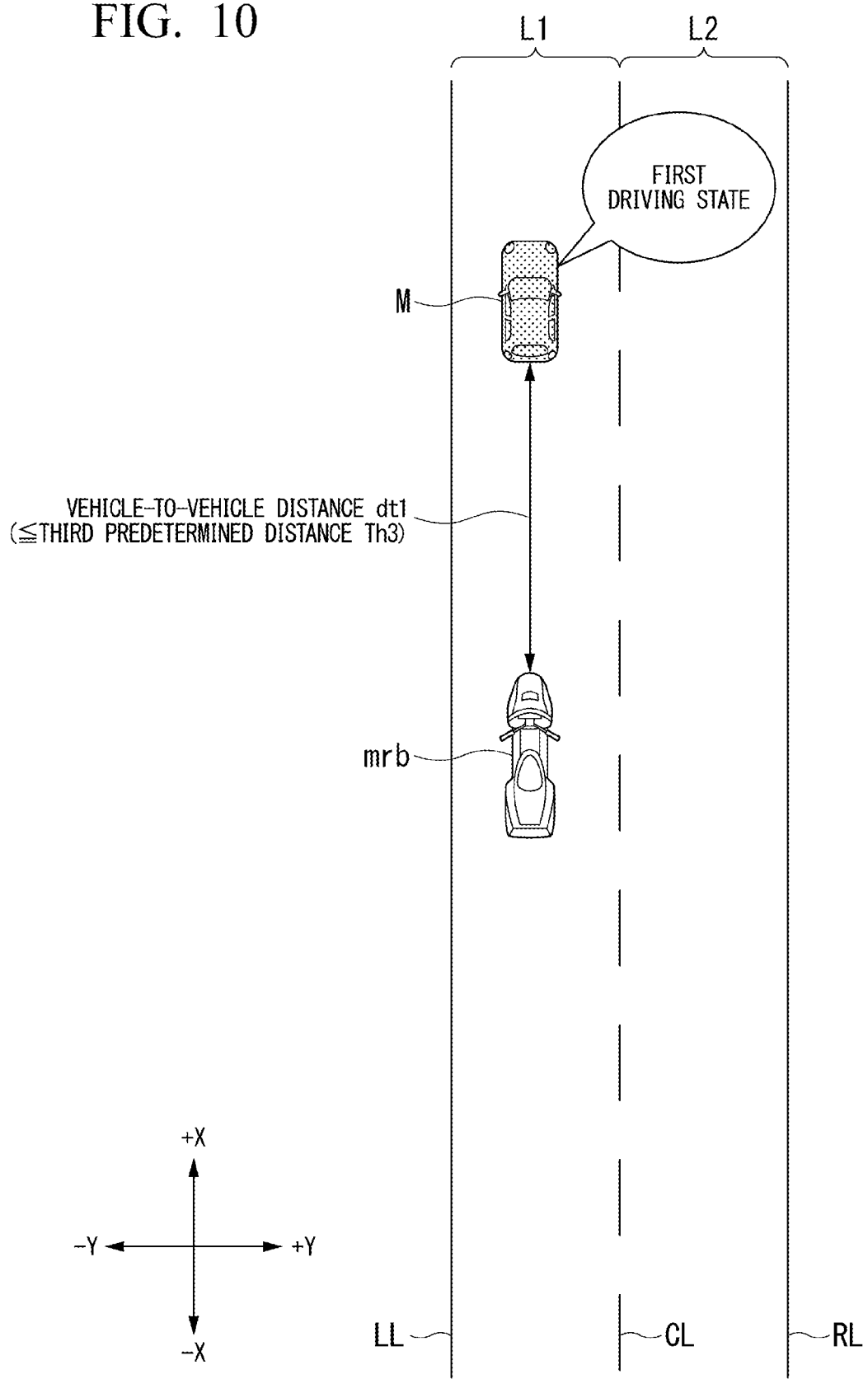
FIG. 10 is a diagram showing an example of a state in which change of driving states of (condition 3) according to Modified Example 1 is performed.

FIG. 10 is a diagram showing an example of a state in which change of driving state of (condition 3) according to Modified Example 1 is performed. In Modified Example 1, when a following vehicle recognized by the other vehicle recognizer 131 is a predetermined type of vehicle (e.g., the following four-wheeled vehicle mr1), the control state changer 141 executes the process of causing the driving state to be changeable from the first driving state to the second driving state if (condition 3) is satisfied. When a following vehicle recognized by the other vehicle recognizer 131 is not the predetermined type of vehicle (e.g., when the following vehicle is a following two-wheeled vehicle mrb), the control state changer 141 prevents execution of the process of causing the driving state to be changeable from the first driving state to the second driving state and maintains the first driving state even if (condition 3) is satisfied.

Modified Example 2

Hereinafter, Modified Example 2 according to the first embodiment will be described with reference to the drawings. In Modified Example 2, a case in which change of driving state of the host vehicle M is prevented on the basis of an offset amount of the following four-wheeled vehicle mr1 will be described. Components that same as those in the above-described embodiment are denoted by the same reference signs and description thereof is omitted.

Figure 11:
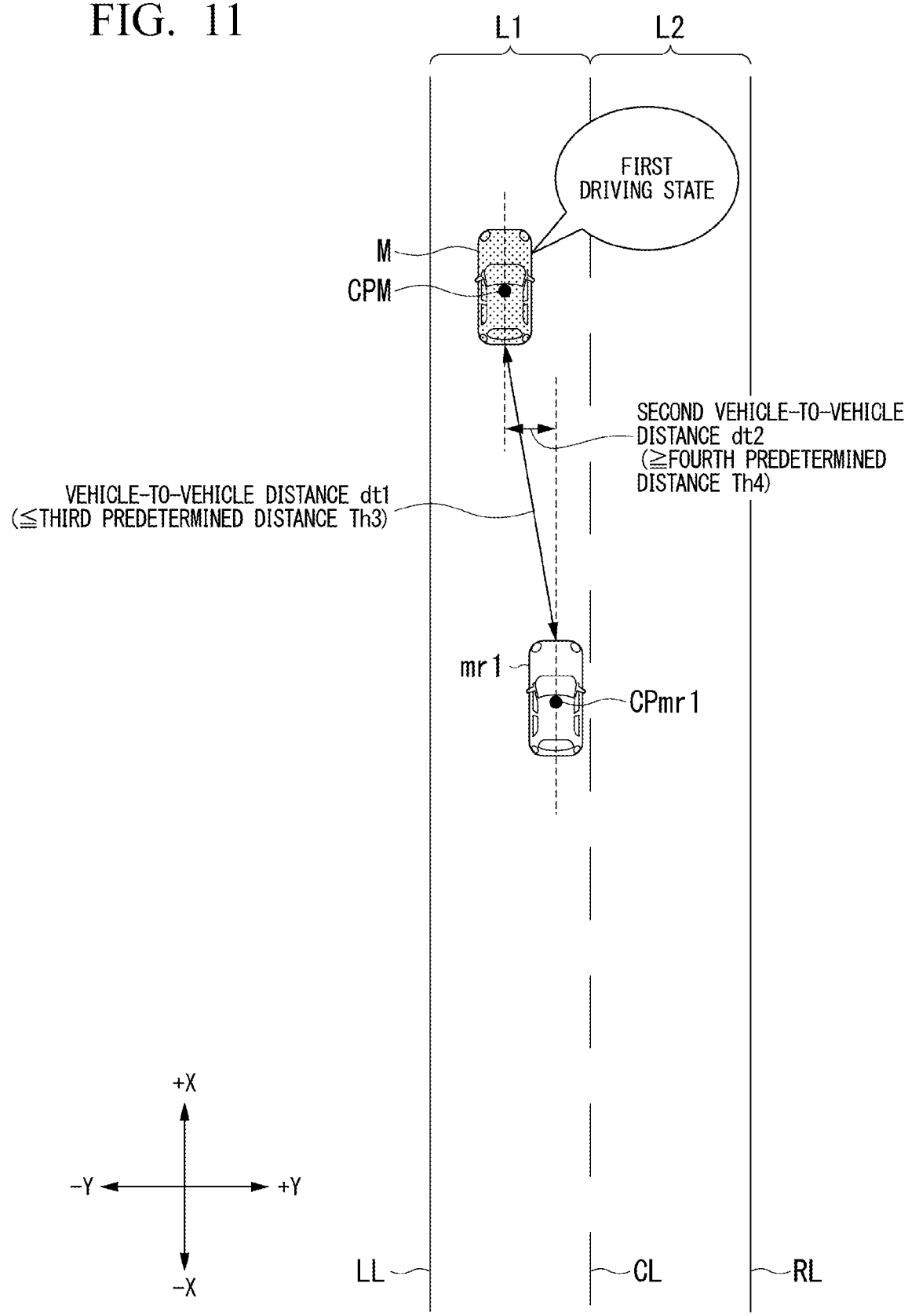
FIG. 11 is a diagram showing an example of a state in which change of driving states of (condition 4) according to Modified Example 2 is performed.

FIG. 11 is a diagram showing an example of a state in which change of driving state of (condition 4) according to Modified Example 2 is performed. In Modified Example 2, the other vehicle recognizer 131 recognizes an offset amount (i.e., the second vehicle-to-vehicle distance dt2) of the following four-wheeled vehicle mr1 with respect to the host vehicle M. The control state changer 141 prevents execution of the process of causing a state to be changeable from the first driving state to the second driving state and maintains the first driving state when the second vehicle-to-vehicle distance dt2 is equal to or greater than a fourth predetermined distance Th4 (condition 4). For example, the fourth predetermined distance Th4 may be a distance of about an offset amount taken by the following four-wheeled vehicle mr1 when the following four-wheeled vehicle mr1 passes the host vehicle M and is shorter than the second predetermined distance Th2.

[Operation Flow]

Figure 12:
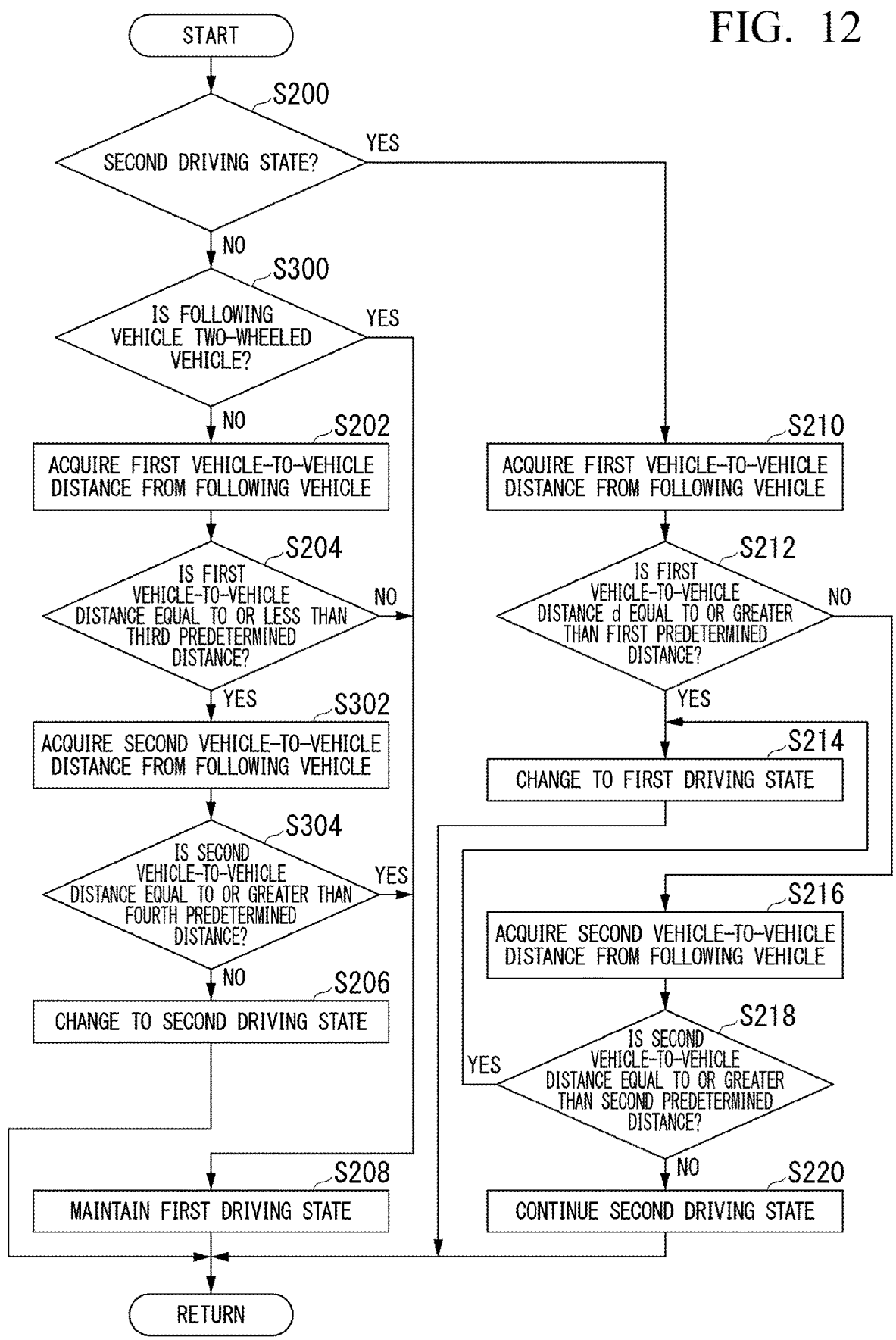
FIG. 12 is a flowchart showing an example of a series of processes of an automated driving control device according to Modified Example 1 and Modified Example 2.

FIG. 12 is a flowchart showing an example of a series of processes of the automated driving control device 100 according to Modified Example 1 and Modified Example 2. Processes the same as those shown in FIG. 9 from among processes shown in FIG. 12 are denoted by the same step numbers and description thereof is omitted.

Processes of steps S300 to S304 are added and performed in the flowchart shown in FIG. 12 as compared to the flowchart shown in FIG. 9. The control state changer 141 determines whether a following vehicle recognized by the other vehicle recognizer 131 is a following two-wheeled vehicle mrb when it is determined that a current driving state is the second driving state (step S300). The control state changer 141 prevents execution of the process of causing the driving state to be changeable from the first driving state to the second driving state and maintains the first driving state when it is determined that the following vehicle is the following two-wheeled vehicle mrb (step S208). The control state changer 141 proceeds with processes to step S202 when it is determined that the following vehicle is not the following two-wheeled vehicle mrb.

The control state changer 141 acquires the second vehicle-to-vehicle distance dt2 between the host vehicle M and the following four-wheeled vehicle mr1 recognized by the other vehicle recognizer 131 when it is determined that the first vehicle-to-vehicle distance dt1 is equal to or less than the third predetermined distance Th3 in step S204 (step S302).

The control state changer 141 determines whether the acquired second vehicle-to-vehicle distance dt2 is equal to or greater than the fourth predetermined distance Th4 (step S304). The control state changer 141 determines that (condition 4) has been satisfied, prevents execution of the process of causing the driving state to be changeable from the first driving state to the second driving state, and maintains the first driving state when the second vehicle-to-vehicle distance dt2 is equal to or greater than the fourth predetermined distance Th4 (step S208). The control state changer 141 proceeds with processes to step S206 when it is determined that the second vehicle-to-vehicle distance dt2 is not equal to or greater than the fourth predetermined distance Th4.

At least one of the process of step S300 and the processes of steps S302 to S304 from among the added processes of steps S300 to S304 in the flowchart shown in FIG. 12 may be performed.

Summary of Modified Example 1

The following two-wheeled vehicle mrb can easily pass the side of the host vehicle M or move to a neighboring lane irrespective of approach of the emergency vehicle eV compared to the following four-wheeled vehicle mr1. Accordingly, the control state changer 141 prevents execution of a process of changing driving states when the following vehicle is the following two-wheeled vehicle mrb. As a result, the control state changer 141 in Modified Example 1 can prevent execution of the process of changing driving states when the following vehicle is the following two-wheeled vehicle mrb and prevent an automated driving level from randomly changing according to a behavior of the following two-wheeled vehicle mrb.

Summary of Modified Example 2

There are cases in which the following four-wheeled vehicle mr1 passes the host vehicle M at a normal time when the emergency vehicle eV is not approaching, and the like. When the following four-wheeled vehicle mr1 passes the host vehicle M, it is desirable that the host vehicle M move such that the following four-wheeled vehicle mr1 easily passes the host vehicle M by being offset to the left in the first lane L1, or the like. Accordingly, it is not desirable to change the driving state to the second driving state that is a high automated driving level at a timing when the following four-wheeled vehicle mr1 tries to pass the host vehicle M by an offset amount equal to or greater than the fourth predetermined distance Th4. According to the control state changer 141 of Modified example 2, it is possible to prevent execution of the process of changing driving states such that traveling of the following four-wheeled vehicle mr1 is not obstructed when the second vehicle-to-vehicle distance dt2 is equal to or greater than the fourth predetermined distance Th4.

Second Embodiment

Hereinafter, a second embodiment will be described with reference to the drawings. In the second embodiment, a case in which the control state changer 141 changes driving states of the host vehicle M on the basis of a state of the following four-wheeled vehicle mr1 instead of the first vehicle-to-vehicle distance dt1 or the second vehicle-to-vehicle distance dt2 will be described. Components the same as those in the above-described embodiment are denoted by the same reference signs and description thereof is omitted.

Figure 13:
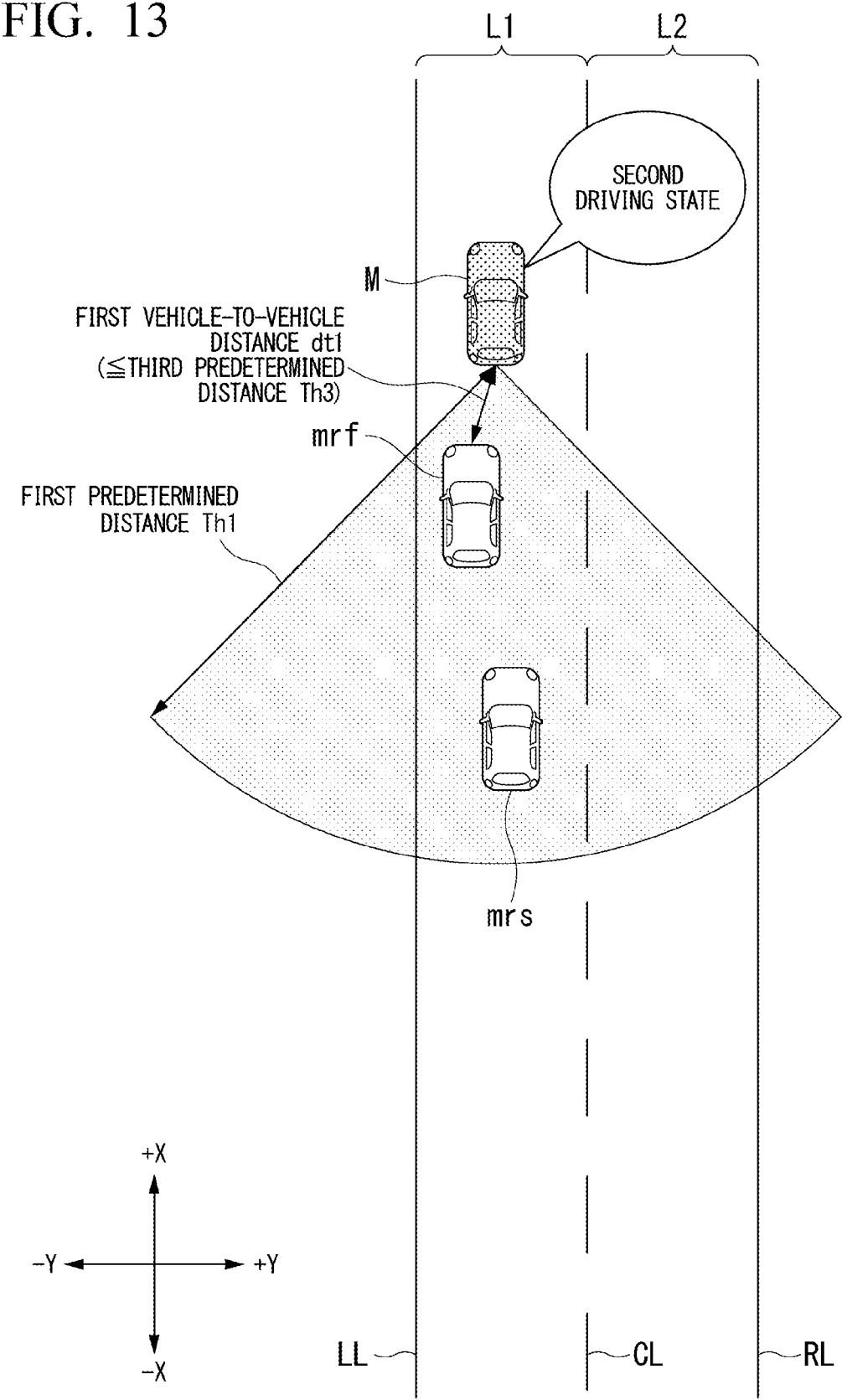
FIG. 13 is a diagram showing an example of a state in which change of driving states according to a second embodiment is performed.

FIG. 13 is a diagram showing an example of a state in which change of driving states according to the second embodiment is performed.

In the second embodiment, the other vehicle recognizer 131 may recognize presence or absence of a plurality of following four-wheeled vehicles mr1, for example. In the following description, a following four-wheeled vehicle mr1 closest to the host vehicle M from among the plurality of following four-wheeled vehicles mr1 is referred to as a first following four-wheeled vehicle mrf and a following four-wheeled vehicle mr1 closest to the first following four-wheeled vehicle mrf is referred to as a second following four-wheeled vehicle mrs. When a plurality of following four-wheeled vehicles mr1 are present within a range from the host vehicle M to the first predetermined distance Th1, for example, the other vehicle recognizer 131 may recognize that a plurality of following four-wheeled vehicles mr1 are present. When a plurality of following four-wheeled vehicles mr1 are not present within the range from the host vehicle M to the first predetermined distance Th1 (e.g., only zero or one following four-wheeled vehicle mr1 is present), the control state changer 141 recognizes that a plurality of following four-wheeled vehicles mr1 are not present.

The control state changer 141 causes the driving state to be changeable from the first driving state to the second driving state or maintains the second driving state when a plurality of following four-wheeled vehicles mr1 are present and the first vehicle-to-vehicle distance dt1 between the first following four-wheeled vehicle mrf and the host vehicle M is within the third predetermined distance Th3 (condition 5). The control state changer 141 changes the driving state from the second driving state to the first driving state when a plurality of following four-wheeled vehicles mr1 are not present (condition 6).

In the state shown in FIG. 13, the other vehicle recognizer 131 recognizes the first following four-wheeled vehicle mrf and the second following four-wheeled vehicle mrs and recognizes that the first vehicle-to-vehicle distance dt1 between the first following four-wheeled vehicle mrf and the host vehicle M is equal to or less than the third predetermined distance Th3. In this case, the control state changer 141 determines (condition 5) has been satisfied and maintains (continues) the second driving state.

Figure 14:
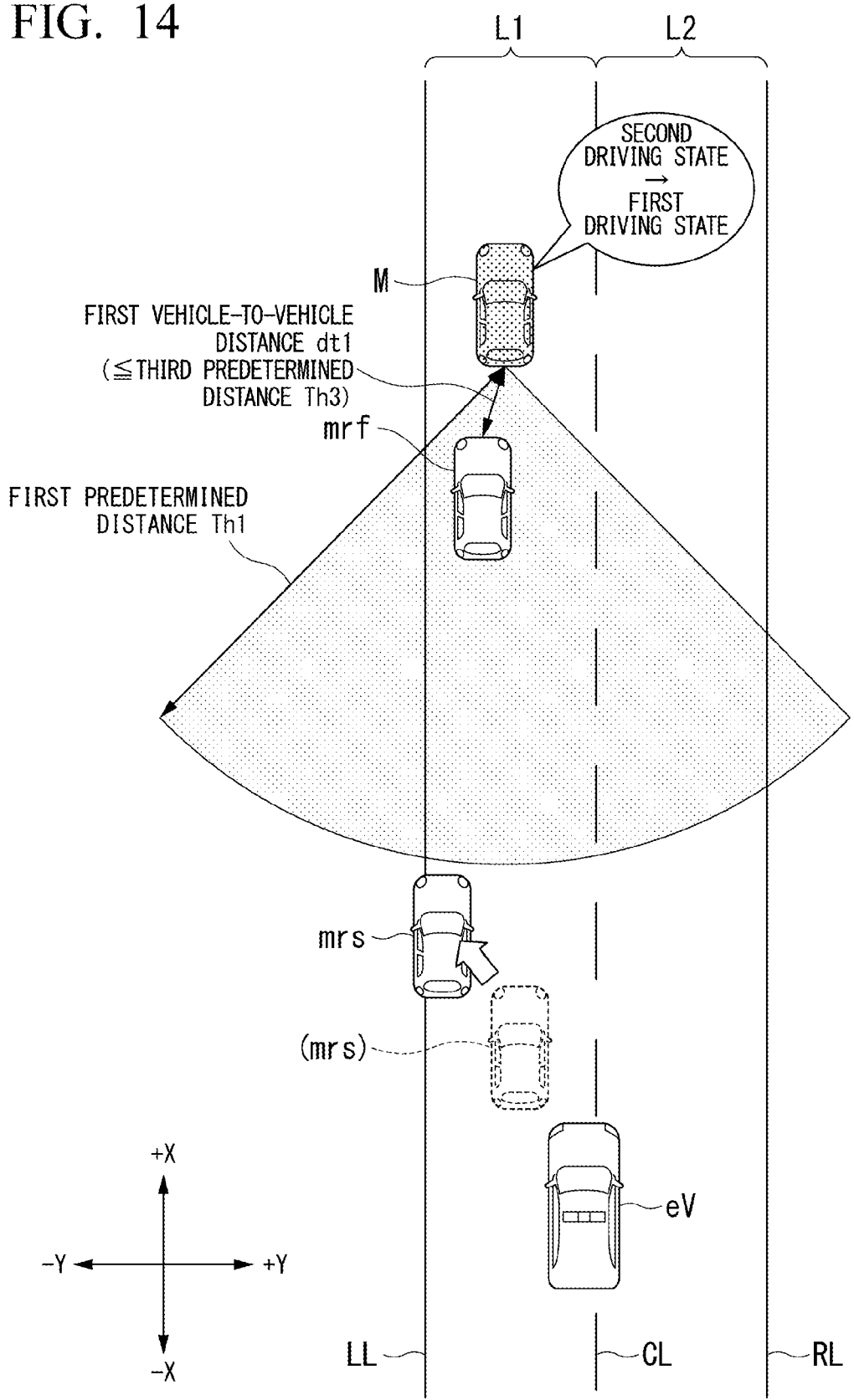
FIG. 14 is a diagram showing an example of a state in which change of driving states according to the second embodiment is not performed.

FIG. 14 is a diagram showing an example of a state in which change of driving state according to the second embodiment is not performed. In the state shown in FIG. 14, the other vehicle recognizer 131 does not recognize the second following four-wheeled vehicle mrs as a following four-wheeled vehicle mr1 even when it recognizes the first following four-wheeled vehicle mrf. For example, it may be determined that the second following four-wheeled vehicle mrs stops on the left road shoulder in a state in which it is traveling in the first lane L1 (illustrated state of the second following four-wheeled vehicle (mrs)) in order to avoid the emergency vehicle eV and stops to clear a travel path for the emergency vehicle eV. In this case, the control state changer 141 determines that (condition 6) has been satisfied and changes the driving state from the second driving state to the first driving state.

[Operation Flow]

Figure 15:
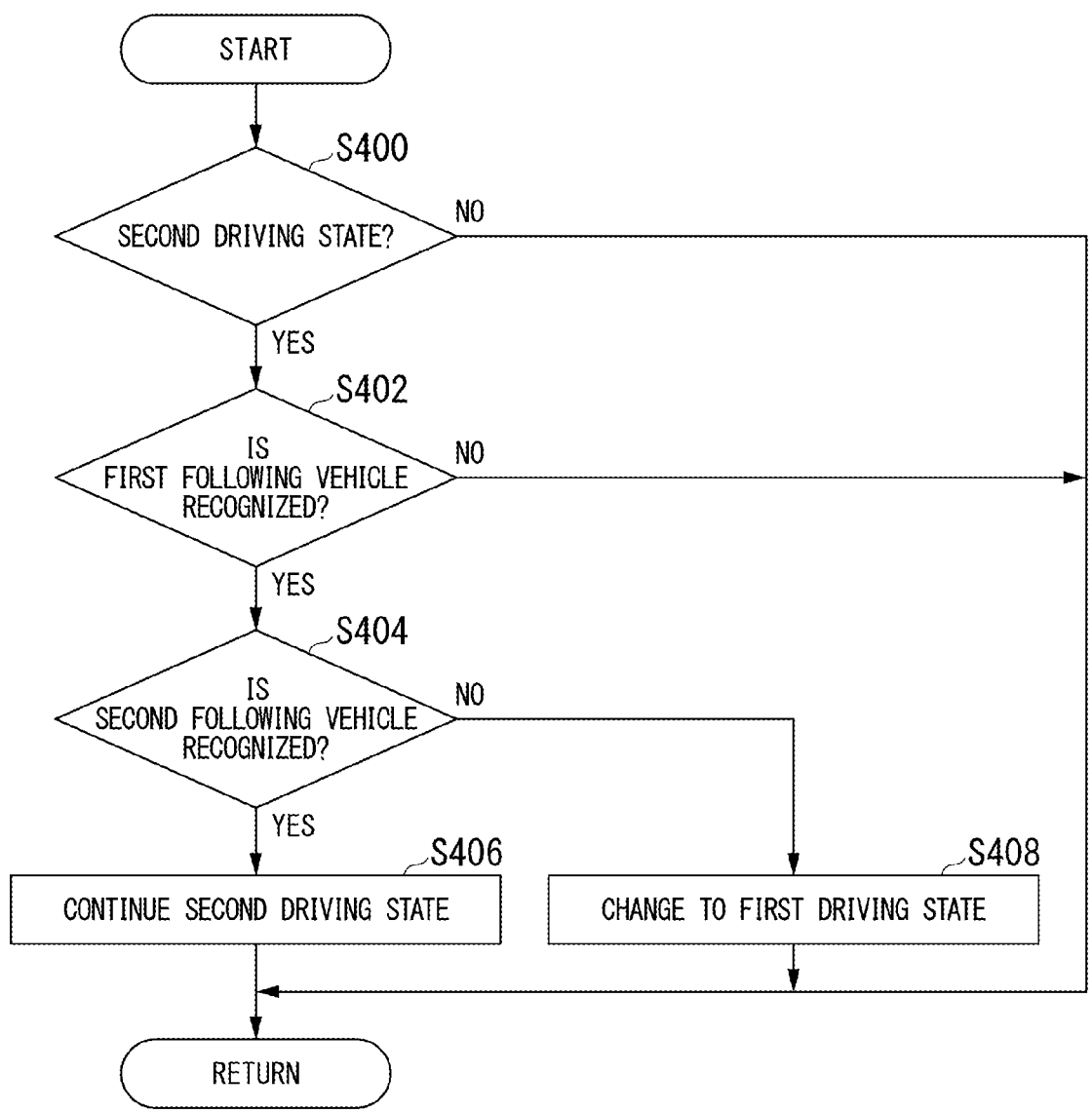
FIG. 15 is a flowchart showing an example of a series of processes of an automated driving control device according to the second embodiment.

FIG. 15 is a flowchart showing an example of a series of processes of the automated driving control device 100 according to the second embodiment. First, the control state changer 141 determines whether a current driving state is the second driving state (step S400). When the driving state is the first driving state, the process is ended because the process of the control state changer 141 according to the second embodiment is not executed. The control state changer 141 determines whether the first following four-wheeled vehicle mrf has been recognized by the other vehicle recognizer 131 when the current driving state is the first driving state (step S402). The control state changer 141 ends the process when the first following four-wheeled vehicle mrf has not been recognized (step S402). The control state changer 141 determines whether the second following four-wheeled vehicle mrs has been recognized when the first following four-wheeled vehicle mrf has been recognized by the other vehicle recognizer 131 (step S404). The control state changer 141 maintains (continues) the second driving state when the second following four-wheeled vehicle mrs has been recognized (step S406). The control state changer 141 changes the driving state from the second driving state to the first driving state when the second following four-wheeled vehicle mrs has not been recognized (step S408).

When the second following four-wheeled vehicle mrs has not been recognized after the first following four-wheeled vehicle mrf and the second following four-wheeled vehicle mrs has been recognized by the other vehicle recognizer 131, the control state changer 141 may not determine that (condition 6) has been satisfied for a predetermined time.

For example, the second following four-wheeled vehicle mrs may travel at a position at which it is difficult for the host vehicle M to recognize it due to a positional relation between the second following four-wheeled vehicle mrs and the first following four-wheeled vehicle mrf. Accordingly, the control state changer 141 does not determine that (condition 6) has been satisfied for a predetermined time (e.g., several to tens of seconds) and waits again until the positional relation becomes a positional relation in which the second following four-wheeled vehicle mrs is recognized.

Summary of Second Embodiment

In the state shown in FIG. 14, the emergency vehicle eV may approach when the second following four-wheeled vehicle mrs does not follow the first following four-wheeled vehicle mrf even when the first following four-wheeled vehicle mrf follows the host vehicle M. As described above, according to the automated driving control device 100 of the present embodiment, it is possible to prepare for approaching of the emergency vehicle eV more rapidly by changing (maintaining) a driving state to the first driving state on the basis of behaviors of a plurality of following four-wheeled vehicles mr1 determined when the emergency vehicle eV has approached.

[Hardware Configuration]

Figure 16:
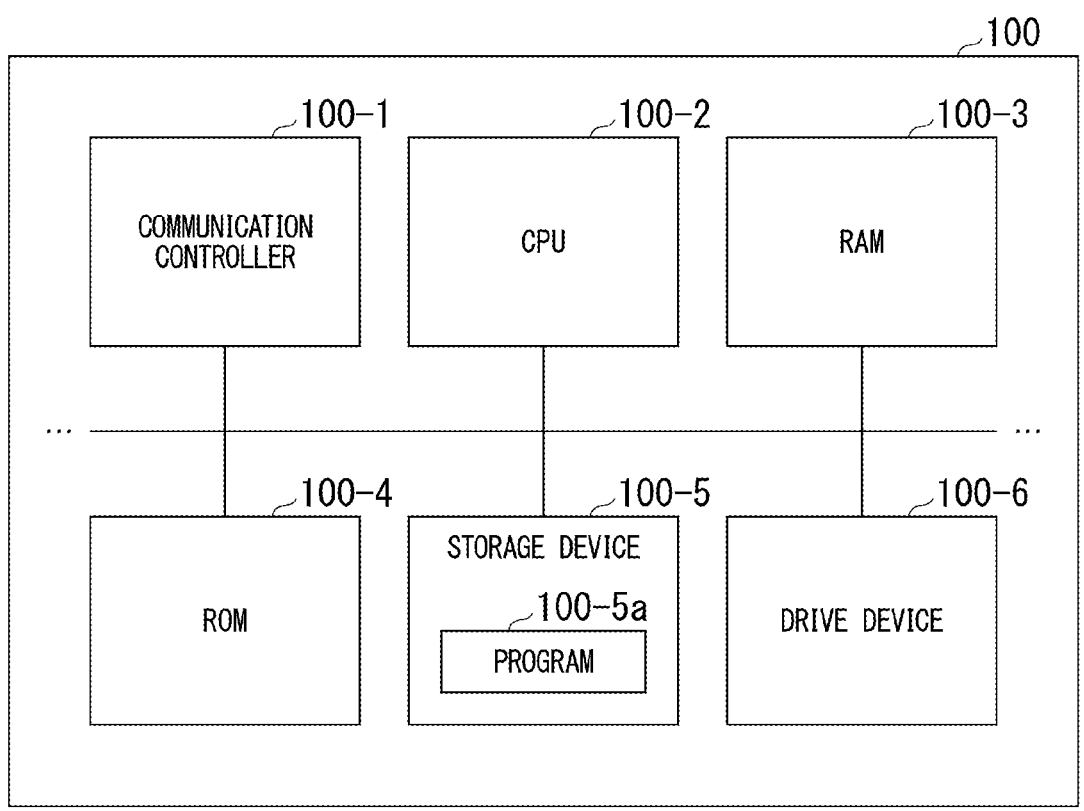
FIG. 16 is a diagram showing an example of a hardware configuration of an automated driving control device.

FIG. 16 is a diagram showing an example of a hardware configuration of the automated driving control device 100. As illustrated, the automated driving control device 100 has a configuration in which a communication controller 100-1, a CPU 100-2, a Random Access Memory (RAM) 100-3 used as a working memory, a Read Only Memory (ROM) 100-4 storing a boot program and the like, a storage device 100-5 such as a flash memory or a Hard Disk Drive (HDD), a drive device 100-6 and the like are connected through an internal bus or a dedicated communication line. The communication controller 100-1 performs communication with components other than the automated driving control device 100. A program 100-5a executed by the CPU 100-2 is stored in the storage device 100-5. This program is developed in the RAM 100-3 according to a Direct Memory Access (DMA) controller (not shown) or the like and executed by the CPU 100-2. Accordingly, part or all of the recognizer 130, the action plan generator 140, and the second controller 160 are realized.

The above-described embodiment can be represented as follows, i.e., a vehicle control apparatus including: a storage device which stores a program; and a hardware processor, wherein the hardware processor is configured to, by executing the program stored in the storage device: recognize a surrounding situation of a host vehicle; control acceleration/deceleration of the host vehicle on the basis of a recognition result; cause the host vehicle to operate in any of a first driving state and a second driving state which has a higher rate of automation or fewer tasks requested with respect to an occupant than the first driving state; and change a driving state of the host vehicle to the second driving state on the basis of at least one of presence or absence of a recognized following vehicle positioned behind the host vehicle and a following vehicle detection situation when the host vehicle is operating in the first driving state.

While forms for embodying the present invention have been described using embodiments, the present invention is not limited to these embodiments and various modifications and substitutions can be made without departing from the spirit or scope of the present invention.

What is claimed is:

1. A vehicle control apparatus comprising:
a central processing unit configured to execute computer-executable components stored on a memory, the computer-executable components comprising:
a controller configured to recognize a surrounding situation of a host vehicle; and
a driving controller configured to control at least one of acceleration or deceleration of the host vehicle based on a recognition result generated by the controller, wherein
the driving controller causes the host vehicle to operate in either of a first driving state or a second driving state that has a higher rate of automation or fewer tasks requested of an occupant than the first driving state,
the driving controller prevents a change of a driving state of the host vehicle to the second driving state in response to determining that a vehicle-to-vehicle distance between a following vehicle recognized by the recognizer controller and the host vehicle changes from being less than a predetermined distance to being longer than the predetermined distance while the host vehicle is operating in the first driving state,
the second driving state is a state in which a task of holding the steering wheel is not assigned to the occupant or a task of keeping eyes forward is not assigned to the occupant, and
the following vehicle is a vehicle that is recognized by the controller and traveling behind the host vehicle in the same direction as the host vehicle.

2. The vehicle control apparatus according to claim 1, wherein
the driving controller is further configured to change the driving state from the first driving state to the second driving state in response to determining that a speed of the host vehicle is less than a predetermined speed, and
the controller is configured to execute a process of recognizing the following vehicle while the host vehicle is operating in the first driving state.

3. The vehicle control apparatus according to claim 1, wherein the driving controller is further configured to, in response to determining that the following vehicle is not recognized by the controller in the second driving state, change the driving state to the first driving state.

4. The vehicle control apparatus according to claim 1, wherein
the predetermined distance is a first predetermined distance, and
the driving controller is further configured to change the driving state to the first driving state in response to determining that the vehicle-to-vehicle distance between the following vehicle and the host vehicle is equal to or greater than a second predetermined distance or a distance between a travel path through which the following vehicle travels and a travel path through which the host vehicle travels in a vehicle width direction is equal to or greater than a third predetermined distance.

5. The vehicle control apparatus according to claim 4, wherein the second predetermined distance is a value determined based on a travel speed of the host vehicle.

6. The vehicle control apparatus according to claim 1, wherein the driving controller is further configured to change the driving state to the second driving state in response to determining that the following vehicle is of a predetermined type while in the first driving state and to prevent change to the second driving state in response to determining that the following vehicle is not of the predetermined type.

7. The vehicle control apparatus according to claim 1, wherein
the predetermined distance is a first predetermined distance, and
the driving controller is further configured to prevent change to the second driving state in response to determining that a distance between the host vehicle and the following vehicle in the vehicle width direction is equal to or greater than a second predetermined distance while in the first driving state.

8. The vehicle control apparatus according to claim 1, wherein the driving controller is further configured to maintain the second driving state in response to determining that a plurality of following vehicles are recognized by the controller and a first following vehicle closest to the host vehicle from among the plurality of following vehicles and a second following vehicle positioned behind the first following vehicle are recognized while in the second driving state, and to change the driving state to the first driving state in response to determining that the first following vehicle is recognized by the controller and the second following vehicle is not recognized by the controller.

9. A vehicle control method, using a computer, comprising:
recognizing a surrounding situation of a host vehicle;
controlling at least one of acceleration or deceleration of the host vehicle based on a result of the recognizing;
causing the host vehicle to operate in either of a first driving state or a second driving state that has a higher rate of automation or fewer tasks requested of a driver than the first driving state; and
preventing a change of a driving state of the host vehicle to the second driving state in response to determining that a vehicle-to-vehicle distance between a following vehicle recognized by the recognizing and the host vehicle transitions from being less than a predetermined distance to being greater than a predetermined distance while the host vehicle is operating in the first driving state,
wherein the second driving state is a state in which a task of holding the steering wheel is not assigned to the driver or a task of keeping eyes forward is not assigned to the driver.

10. A computer-readable non-transitory storage medium that stores computer-executable components that, in response to execution, cause a computer to:
recognize a following vehicle that follows a host vehicle;
control at least one of acceleration or deceleration of the host vehicle based on recognition of the following vehicle;
cause the host vehicle to operate in either of a first driving state or a second driving state that has a higher rate of automation or fewer tasks requested of an occupant than the first driving state; and
prevent a change of a driving state of the host vehicle to the second driving state in response to determining that a vehicle-to-vehicle distance between the following vehicle and the host vehicle becomes longer than a predetermined distance while the host vehicle is operating in the first driving state,
wherein the second driving state is a state in which a task of holding the steering wheel is not assigned to the occupant or a task of keeping eyes forward is not assigned to the occupant.

* * * * *